(12) United States Patent
Anderson et al.

(10) Patent No.: US 11,923,129 B2
(45) Date of Patent: Mar. 5, 2024

(54) CONTROL SYSTEM FOR TRANSFORMER PROTECTION SYSTEM

(71) Applicant: TechHold LLC, Minneapolis, MN (US)

(72) Inventors: David Anderson, Excelsior, MN (US); Greg Fuchs, River Falls, WI (US)

(73) Assignee: TechHold LLC, Minneapolis, MN (US)

( * ) Notice: Subject to any disclaimer, the term of this patent is extended or adjusted under 35 U.S.C. 154(b) by 0 days.

(21) Appl. No.: 17/667,197

(22) Filed: Feb. 8, 2022

(65) Prior Publication Data
US 2022/0254565 A1    Aug. 11, 2022

Related U.S. Application Data

(60) Provisional application No. 63/219,345, filed on Jul. 7, 2021, provisional application No. 63/149,038, filed on Feb. 12, 2021, provisional application No. 63/147,046, filed on Feb. 8, 2021.

(51) Int. Cl.
*H02H 7/04* (2006.01)
*H01F 27/40* (2006.01)

(52) U.S. Cl.
CPC .......... *H01F 27/402* (2013.01); *H02H 7/042* (2013.01)

(58) Field of Classification Search
CPC ........ H02H 3/00–04; H02H 3/12; H02H 3/14; H02H 3/16; H02H 3/18; H02H 3/24; H02H 3/38; H02H 3/26; H02H 3/44; H02H 3/08; H02H 3/20; H02H 3/50; H02H 3/52; H02H 3/162; H02H 7/00–06; H02H 7/042; H02H 7/08; H02H 7/10; H02H 7/16; H02H 5/00; H02H 5/005; H02H 1/04; H02H 9/00
See application file for complete search history.

(56) References Cited

U.S. PATENT DOCUMENTS

2016/0197469 A1* 7/2016 Fuchs .................. H02H 7/04
361/35

FOREIGN PATENT DOCUMENTS

| CN | 105490249 B | 3/2018 |
| CN | 108711829 A | 10/2018 |

OTHER PUBLICATIONS

Faxvog et al., "Power Grid Protection against Geomagnetic Disturbances (GMD)," IEEE Electrical Power & Energy Conference (EPEC), pp. 1-13 (2013).
International Search Report and Written Opinion for Application No. PCT/US2022/015714 dated May 24, 2022.

* cited by examiner

*Primary Examiner* — Bryan R Perez
(74) *Attorney, Agent, or Firm* — Merchant & Gould P.C.

(57) ABSTRACT

Methods and systems for controlling a circuit designed to protect electrical equipment, in particular sensitive power grid equipment such as transformers, are disclosed. In particular, methods of local and remote control of operation of protection circuits are provided that allow for remote access to change an operational mode of such protection circuits, while ensuring that power grid equipment is protected locally regardless of any configuration instructions received from a remote or centralized facility. Override levels may be set to ensure power grid transformer protection, regardless of operational mode or remote instruction.

34 Claims, 24 Drawing Sheets

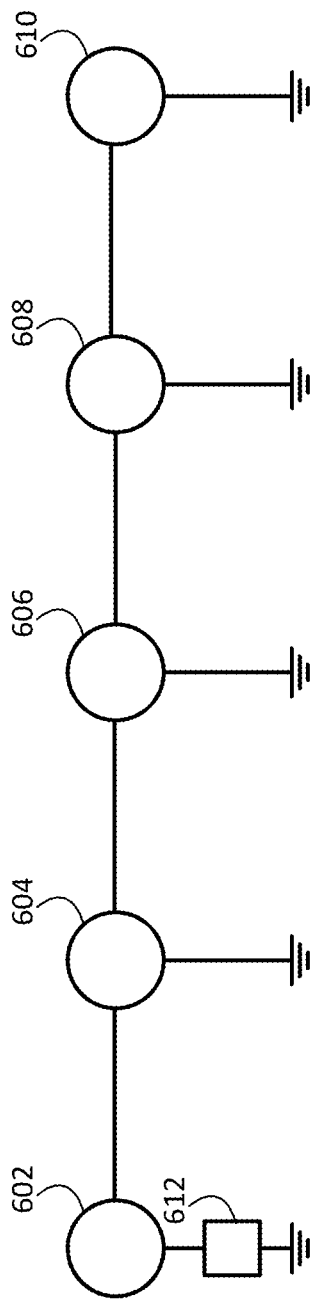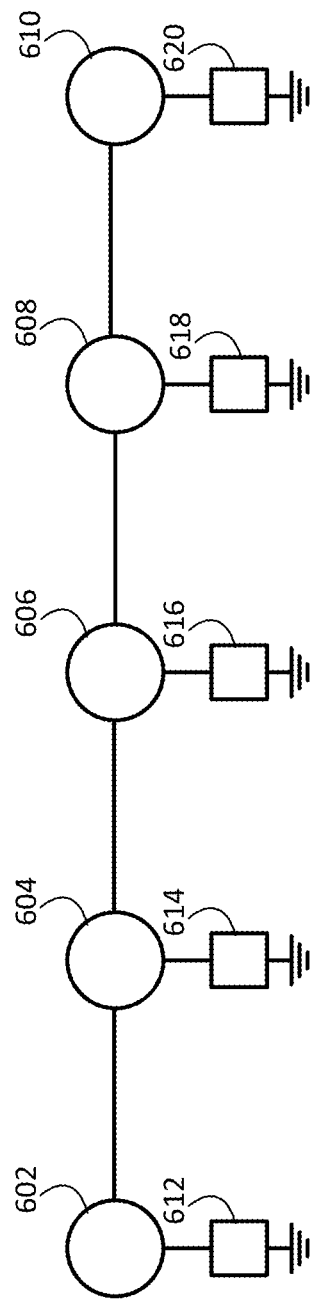

CONTROL SYSTEM FOR TRANSFORMER PROTECTION SYSTEM

CROSS-REFERENCE TO RELATED APPLICATIONS

The present application claims priority from U.S. Provisional Application No. 63/219,345, filed on Jul. 7, 2021, U.S. Provisional Patent Application No. 63/149,038, filed on Feb. 12, 2021, and U.S. Provisional Patent Application No. 63/147,046, filed on Feb. 8, 2021. The disclosures of these applications are hereby incorporated by reference in their entireties.

BACKGROUND

Electrical equipment, and in particular electrical equipment operating using alternating current, is subject to varying input signals and conditions. In typical arrangements, alternating current devices in the United States expect to receive a 60 Hz power line source (or 50 Hz in Europe) having a predetermined magnitude (e.g., 120 Volts). Although these power sources may vary somewhat, devices made for use with a particular current can typically handle some slight variation in the power signal received.

In some cases, a power signal can vary widely due to harmonics or other external conditions. Harmonics and quasi-DC currents can be the result of, for example, Geomagnetic (Solar) storms, Electromagnetic Pulse ("EMP"), or other electrical equipment, such as switching power supplies, arc equipment, welding equipment, etc., which are on the same power grid or local power circuit. Harmonics and quasi-DC currents can cause the input voltage and current (and resulting power) of a power signal to vary dramatically, causing a potential for damage to electrical equipment connected to that power source.

For example, it is widely recognized that geomagnetic disturbances (GMD) such as geomagnetic storms or the E3 pulse associated with a high altitude electromagnetic pulse (HEMP-E3) can induce DC or quasi-DC currents called Geomagnetic Induced Currents (GIC) or high altitude electromagnetic E3 pulse (HEMP-E3) induced currents in high voltage power generation, transmission, and distribution system components (e.g., power transmission lines, power transformers, etc.). These DC currents can cause half-cycle saturation in power transformer cores which in turn can result in excessive reactive power losses, since transformers consume more Volt-Ampere-Reactive energy (VARs) in these circumstances. Additionally, DC currents can cause heating, damage and/or failure of such transformers. In addition the half-cycle saturation can cause the generation of harmonics of the primary frequency (50 or 60 Hz). This harmonic content in turn can cause power system relays to trigger, which can decouple required power components. This in turn can result in the collapse of local or wide area portions of a power grid.

Modern power grids are moving away from VAR producing coal power plants and progressing towards green energy such as wind and solar power. These power sources generally cannot produce VARs which makes it increasingly more difficult to supply VARs to prop up the voltage and prevent voltage collapse during a large solar storm. Therefore, the move towards wind and solar makes a grid more susceptible to quasi-DC currents from GMD events and E3 events. This makes the need to block GIC or HEMP-E3 induced DC currents even more crucial to ensure a reliable and stable power grid.

Aside from the VAR loss issue, utility operating procedures to lower the load at locations where the highest GIC is expected (to prevent thermal damage to those transformers) actually increases the risk to those circuit breakers. High voltage circuit breakers are not designed for GIC (DC current). They require "zero crossings" as the AC current changes from positive to negative twice per cycle to break that current. By lowering the AC current, it takes less DC current to have a DC bias (ratio of DC to AC current) and increases the risk of no "zero crossings" needed to break AC current. Grid operators have to make a choice between saving the transformer or having reliable control over the grid via the circuit breakers. Accordingly, reduction, or minimization, of DC current in an AC power grid is desirable.

Over approximately the last few decades, several suggested approaches have been proposed relating protection circuits for reducing GIC or HEMP-E3 induced currents in power systems. These solutions generally take one of a few forms. A first class of solutions uses a capacitive circuit to simultaneously provide the alternating current (AC) grounding path and a block for the induced DC currents. These solutions generally include a set of switches that allow switching between a normal grounded transformer connection and grounding through the capacitive circuit.

A further class of solutions generally uses a resistive approach in which fixed value resistors are used to continuously reduce the DC current in the neutral to ground connection of a transformer; however in these approaches, the resistors typically must have a high resistance value and would only reduce, not eliminate the DC or quasi-DC neutral current and do not prevent harmonics or VAR losses. Additionally, during the installation of these classes of solutions a readjustment of the power system's relay settings may be required.

In some variations of the solutions described above, control circuitry can be provided which defines the conditions under which protection circuits may be operated. For example, in the capacitive circuit solutions, a local control circuit may actuate switches to avoid damage to electrical equipment, or to the protection circuit itself. However, even these solutions lack adequate features for coordinating operation of one or more such protection circuits on behalf of a utility tasked with monitoring and maintenance of portions of the power grid. Additionally, while such systems are often designed to address temporary events, they may not be adequately configured for operation in circumstances where repeated or prolonged, potentially damaging events are experienced, or where such events are so severe that they would damage not just the electrical equipment, but also the protection circuit associated thereto.

Utilities would like more control over the protection systems but not open up the potential for a weak link for Cyber Hackers to exploit. Accordingly, control system improvements for transformer protection, particularly in power grids or other large electrical distribution systems, are desirable.

SUMMARY

In accordance with the following disclosure, the above and other issues may be addressed by the following:

In a first aspect, a control circuit communicatively connected to a transformer protection circuit including a direct current blocking component electrically connected between a transformer neutral and a ground and a switch assembly electrically connected in parallel to the direct current blocking component is disclosed. The control circuit includes a programmable circuit configured to execute instructions which cause the control circuit to adjust a default setting for operation of the transformer protection circuit between a first mode and a second mode. In the first mode, a switch assembly of the transformer protection circuit operates in a normally-closed state and automatically opens to remove a bypass path from between the transformer neutral and the ground based on detection of a triggering event, the bypass path bypassing the direct current blocking component. The triggering event is at least one of: a direct current or quasi-direct current between the transformer neutral and the ground, a direct current voltage at the transformer neutral, or a harmonic signal in at least one phase of the transformer, or in some instances, an EMP detected in the general proximity of the transformer. In the second mode, the switch assembly operates in a normally-open state and automatically closes to form the bypass path between the transformer neutral and the ground based on detection of a second triggering event. The second triggering event is at least one of: an alternating current voltage or direct current voltage at the transformer neutral above a predetermined threshold set, based in part, on a limit of the direct current blocking component; an alternating current between the transformer neutral and the ground exceeding a second predetermined threshold; a time-overvoltage at the transformer neutral exceeding a predetermined threshold; or actuation of an overvoltage protection device positioned in parallel with the direct current blocking component between the transformer neutral and the ground.

In a second aspect, a control circuit communicatively connected to a transformer protection circuit including a direct current blocking component electrically connected between a transformer neutral and a ground and a switch assembly electrically connected in parallel to the direct current blocking component is disclosed. The control circuit includes a programmable circuit configured to execute instructions to: detect a triggering event at the transformer neutral; based on the triggering event occurring, determine whether to actuate the switch assembly to automatically close to form a bypass path between the transformer neutral and the ground; and based on a hazard condition being present when the triggering event is detected, override the determination of whether to actuate the switch assembly, thereby maintaining the switch assembly in an open position. The triggering event includes a time-overvoltage at the transformer neutral exceeding a predetermined threshold; an alternative current or direct current voltage exceeding a second predetermined threshold, an alternating current exceeding a third predetermined threshold or actuation of an overvoltage protection device positioned in parallel with the direct current blocking component between the transformer neutral and the ground. The hazard condition includes at least one of a direct current voltage at the transformer neutral exceeding a hazard threshold, an electromagnetic E1 pulse event, or a geomagnetically induced current or voltage having a rise time of less than a predetermined time, such as 25 seconds, or as little as 0.1 seconds.

In a third aspect, a method of operating a transformer protection circuit is disclosed. The method includes monitoring a voltage at a transformer neutral of a transformer positioned within the power grid, the transformer neutral being electrically connected to a direct current blocking component that electrically connects the transformer neutral to a ground, and, based on the direct current voltage being below a predetermined threshold, determining whether an electrical condition exists to actuate a switch assembly to automatically close to form a bypass path between the transformer neutral and the ground, the switch assembly being operable in a first mode or a second mode. The method further includes, based on the voltage at the transformer neutral being above a predetermined threshold, overriding the determination of whether to actuate the switch assembly, thereby maintaining the switch assembly in an open position and eliminating the bypass path regardless of whether the switch assembly is operating in the first mode or the second mode. In the first mode, the switch assembly operates in a normally-closed state and automatically opens to remove a bypass path from between the transformer neutral and the ground based on detection of a triggering event, the bypass path bypassing the direct current blocking component. In the second mode, the switch assembly operates in a normally-open state and automatically closes to form the bypass path between the transformer neutral and the ground based on detection of a second triggering event.

In a further aspect, a control circuit is disclosed. The control circuit is communicatively connected to a transformer protection circuit including a direct current blocking component electrically connected between a transformer neutral and a ground and a switch assembly electrically connected in parallel to the direct current blocking component. The control circuit includes a programmable circuit and a memory storing instructions executable by the programmable circuit. The instructions cause the control circuit to perform a method comprising: initiating operation of the control circuit in a selected mode, the selected mode being operator-selectable from between an automatic mode and a manual mode. In the automatic mode, the control circuit operates to automatically actuate the switch assembly from an open position to a closed position in response to one or more grounding conditions using grounding code to establish a solid metallic path between a transformer neutral and ground; and automatically actuate the switch assembly from the closed position to the open position in response to one or more blocking conditions using blocking code to disconnect the solid metallic path between the transformer neutral and ground. In the manual mode, the control circuit operates to maintain the switch assembly in a closed position using manual closed code, thereby maintaining the solid metallic path between the transformer neutral and the ground regardless of presence of the one or more blocking conditions, and to maintain the switch assembly in an open position using manual open code, thereby maintaining disconnection of the solid metallic path between the transformer neutral and the ground regardless of presence of the one or more grounding conditions.

In a still further example aspect, a method of operating a control circuit communicatively connected to a transformer protection circuit is disclosed. The transformer protection circuit includes a direct current blocking component electrically connected between a transformer neutral and a ground and a switch assembly electrically connected in parallel to the direct current blocking component. The method includes: operating in a normally-closed state in which the switch assembly is maintained in a default closed state to form a bypass path between the transformer neutral and the ground; removing the bypass path from between the transformer neutral and the ground based on detection of a triggering event, thereby disconnecting the transformer neutral from the ground. The triggering event includes at least one of: a direct current or quasi-direct current between the transformer neutral and the ground being above a threshold; a direct current or quasi-direct current in at least one phase of the transformer; a direct current voltage at the transformer neutral; a harmonic signal in at least one phase of the transformer; or an electromagnetic event detected in a vicinity of the transformer. The method further includes monitoring a voltage at the transformer neutral to determine whether the triggering event has ended, wherein monitoring the voltage includes determining that the voltage is below a threshold voltage level for at least a predetermined amount of time. The method also includes, upon determining that the triggering event has ended, closing the switch assembly and reentering the normally-closed state.

BRIEF DESCRIPTION OF THE DRAWINGS

FIGS. 6A-6B are schematic diagrams of a power grid illustrating induced voltages between transformer substations in the presence of direct current blocking at transformer neutrals across such a power grid;

DETAILED DESCRIPTION

Figure 1:
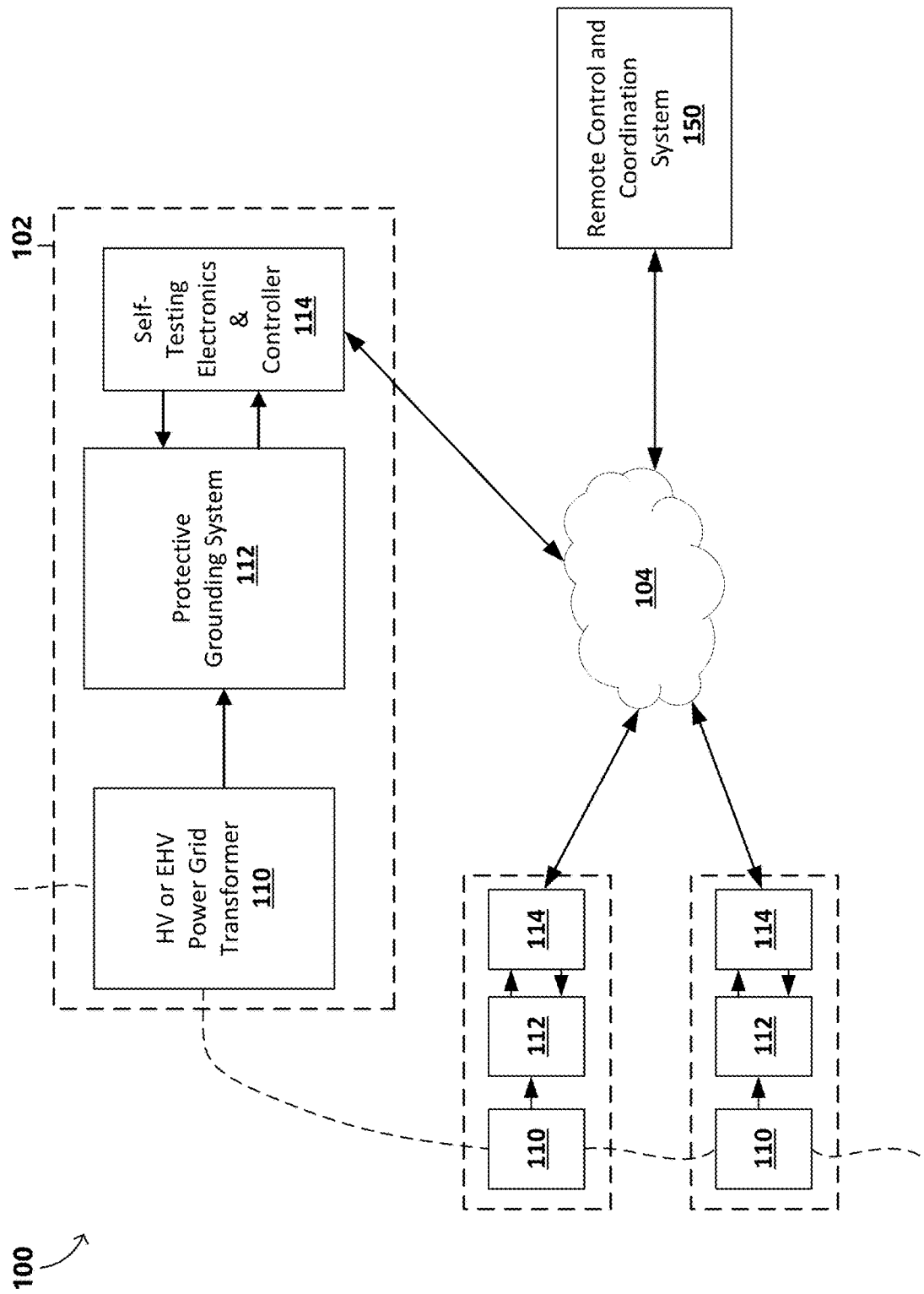
FIG. 1 is a schematic diagram of a transformer protection system including a control system operable according to various embodiments of the present disclosure.

As briefly described above, embodiments of the present invention are directed to methods and systems for controlling a circuit designed to protect electrical equipment, in particular sensitive power grid equipment such as transformers. Particular embodiments described herein provide for methods of local and remote control of operation of protection circuits, thereby allowing for remote access and limited control to such protection circuits while ensuring that power grid equipment is protected locally regardless of any configuration instructions received from a remote or centralized facility. This gives the desired control to power grid operators while decreasing cyber risk.

By way of background, there is a desire to provide increasing remote operation of such circuits, for example to remotely actuate switching of protection circuits to allow for coordinated operation. However, because of the need for extreme security surrounding the electrical equipment being monitored (typically large-scale power grid facilities, or entire power grid providers), an open network and/or freely, remotely-programmable operation is not feasible. Although in certain extreme scenarios a decision needs to be made automatically to take a path with the least amount of damage or upset to electrical equipment and or the protection circuit, power grid operators wanting remote control of a protection circuit have the potential to open up vulnerabilities to cyber hacks by bad actors who could alter or negatively impact the functionality of the protection circuit. In accordance with aspects of the present disclosure, rather than simply opening or closing the switch assembly remotely, different remote default operation modes may be provided for a protection circuit. The different default modes of operation may change some system behavior, but maintain local overall control and actions responsive to potentially damaging events at the electrical device itself, while allowing certain aspects of operation (e.g., default operations that would occur in the absence of potentially damaging conditions) to be modified from a remote location. This provides some conveniences of remote control of such protection circuits without allowing remote override of protective features of those circuits.

In still further example embodiments, events that occur within a transformer protection system, e.g., voltages experienced on a power grid, may dictate that particular operations are either allowed or disallowed to occur within an electrical system. For example, in some instances, a protective circuit may be allowed to move or switch into blocking mode, but may be disabled from switching out of blocking mode automatically. In still further examples, such a switch assembly may be deactivated from receiving remote events to switch out of blocking mode, thereby avoiding potential hacking events when electrical systems may otherwise be vulnerable to damage. Accordingly, additional flexibility of control and protection may be provided within such an electrical protection circuit, as compared to simply disabling entirely the ability for the circuit to switch states automatically.

I. System Components

Referring first to FIGS. 1-7, an example set of components useable to achieve protection of a power grid or other electrical system utilizing three-phase transformers are provided.

FIG. 1 is a schematic view of an example system 100 for protection of electrical equipment, such as transformers that may be interconnected within a power grid. The system 100 includes example electrical equipment protected according to features of the present disclosure, and a physical layout of certain components of the present disclosure. In the embodiment shown, a piece of electrical equipment, shown as a high-voltage transformer 110, is electrically connected to an electrical protection system 112. The electrical protection system 112 can, for example, include at least a portion of the devices described below, according to the embodiments shown in FIGS. 2-3. The high voltage transformer 110 may be mounted on a concrete pad for stability and isolation from the ground. An electrical protection system 112 is electrically connected to the high voltage transformer 110 as discussed above and placed on electrically grounded supports (not shown). In some embodiments, in addition to protecting against GIC events, all control electronics (semiconductor devices) are enclosed in an EMP/IEMI shielded and electrically filtered enclosure that protects a controller 114 that is connected to the electrical protection system 112 and high voltage transformer 110. Sensors that are vulnerable to E1 may also be connected to E1 signal line filters to protect them from the E1 pulse. Some embodiments do not include the EMP/IEMI shielded and electrically filtered enclosure surrounding the controller 114. It should be noted that in these embodiments the system is capable of protecting transformers, AC high voltage breakers and generators against the effects of GIC and EMP E3 events but not against EMP E1 pulse threats.

Figure 2:
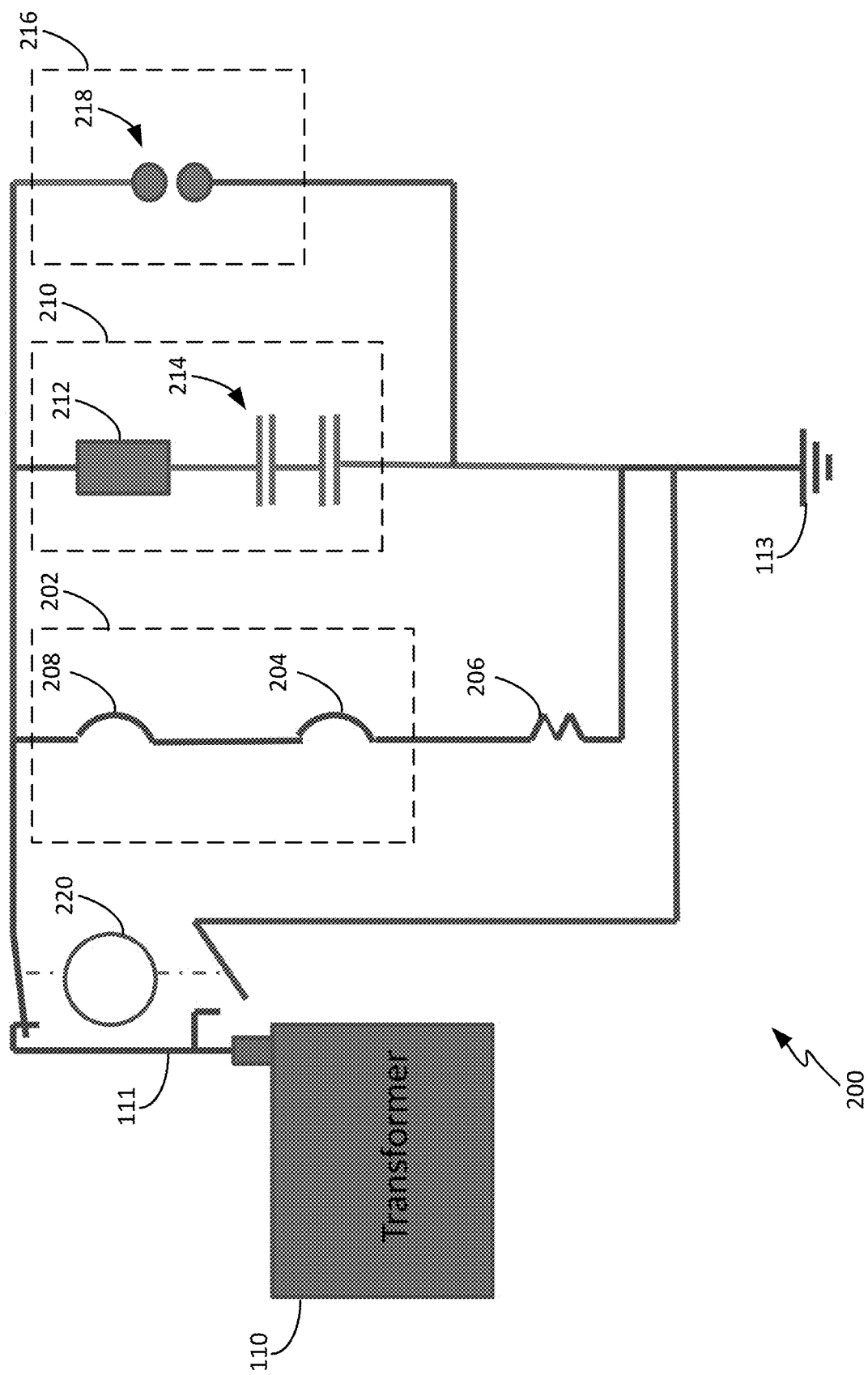
FIG. 2 is a schematic diagram of a transformer protection circuit operable in conjunction with the control system described herein.
Figure 3:
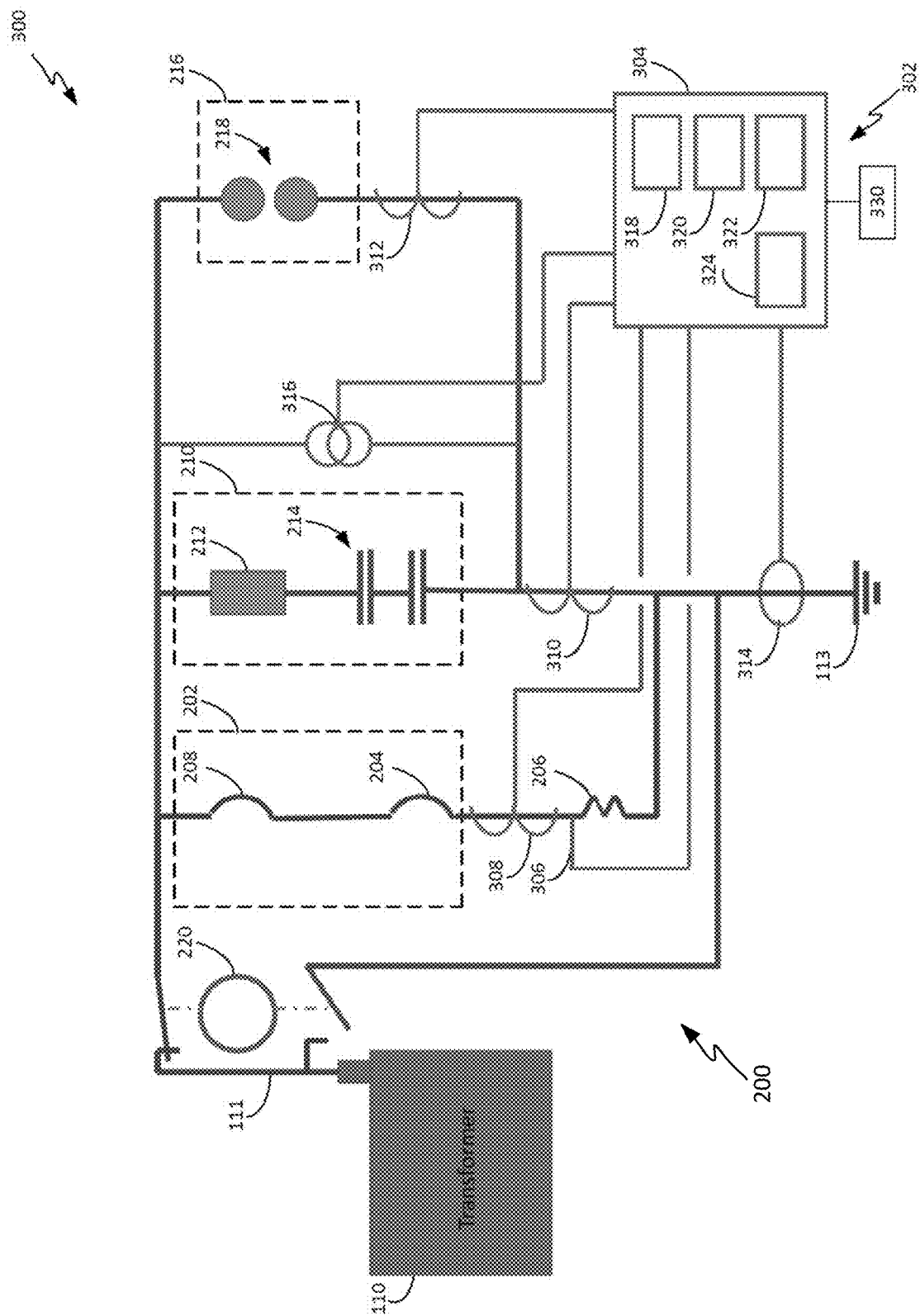
FIG. 3 is a schematic diagram of an example control system for a transformer protection circuit, according to an example embodiment.

In certain embodiments, the electrical protection system 112 includes the switch assemblies and DC current blocking components discussed in FIGS. 2-3, while the controller 114 contains sensing and switch actuation circuitry that operate to perform at least some of the processes described in FIGS. 4-22 herein; however, other arrangements of components for an electrical protection device can be provided.

In the example shown, the transformer 110, electrical protection system 112, and controller 114 are positioned at a particular location 102. A plurality of such locations 102 may be included within a power grid or other power distribution system. These locations may be remote from each other, but electrically connected via a power grid (shown as interconnections among transformers 110).

In the example shown, a remote control and coordination system 150 may be communicatively connected to each of the controllers 114 at respective locations 102, for example via a network 104. The network 104 may be a private communication network managed by a power utility, or may be a public network, such as the Internet. In the case that a public network is used, communication from the remote control and coordination system 150 to each of the controllers 114 may be performed using secure communications, e.g., encrypted via a public/private key pair or similar means.

In the example shown, and as discussed in further detailed below, each of the electrical protection systems 112 may be operable in one of at least two modes. The remote control and coordination system 150 may be configurable to change the default operating mode of each of the electrical protection systems 112 via communication with the respective controller 114. However, to further ensure proper operation of the electrical protection systems, and mitigate the risk of cyberattack affecting operation of the power grid, in preferred embodiments the remote control and coordination system 150 may not be configured to directly affect a current state of each electrical protection system (e.g., the open/closed status of a switch included within the electrical protection system, which may affect whether current or voltage may be discharged from a transformer neutral to ground).

Referring now to FIG. 2, an embodiment of an electrical protection circuit 200 is shown, according to the present disclosure. The electrical protection circuit 200 generally is connected between a transformer neutral 111 of a transformer 110 and an electrical ground 113. The electrical protection circuit 200 can, in some circumstances, correspond to the electrical protection system 112 of FIG. 1.

In the embodiment shown, the electrical protection circuit 200 includes a switch assembly 202 including an electrically controlled DC switch 204 connected between the transformer neutral 111 and electrical ground 113. A shunt resistor 206 can be connected in series with the switch assembly, between the DC switch 204 and electrical ground 113, which can be used to sense DC current passing between the transformer neutral 111 and electrical ground 113. In certain embodiments, the shunt resistor 206 has a lower resistance, on the order of one to a few milliohms, to allow for a low impedance ground connection through the switches. In another embodiment, the shunt resistor 206 could be replaced by a Hall effect current sensor or other non-contact current sensor. Additionally, an electrically-controlled alternating current (AC) switch 208 can be connected between the transformer neutral 111 and the DC switch 204, for example to protect the DC switch 204 from high voltages during a ground fault event. As an example, one or both of the alternating current (AC) switch 208 and the DC switch 204 may comprise circuit breakers. In some embodiments, the electrical ground 113 can be connected to a station ground grid, while in other embodiments it can be connected to the transformer housing which is in turn grounded. In other embodiments the switch assembly may be an AC switch or a DC Switch.

The DC switch 204 can be any of a variety of fast acting electrically-controlled switches, such as a high voltage circuit breaker switch. In the embodiment shown, the DC switch 204 is a normally-closed connection which can be opened rapidly via an electrical control input. Example sensing and control circuitry that can be connected to the control input is discussed further in connection with FIG. 3, below. In some embodiments, during a circuit opening event, e.g., when the DC switch 204 opens, a signal from the DC switch 204 then opens the alternating current (AC) switch 208. Shortly thereafter, the DC switch 204 may be configured to close but the alternating current (AC) switch 208 remains open and protects the DC switch from any overvoltage on the neutral connection.

A DC current blocking component 210 is connected in parallel with the switch assembly 202 between the transformer neutral 111 and the electrical ground 113. As further explained in the examples below, the DC current blocking component 210 can include one or more direct current blocking devices (e.g., capacitors or resistors) capable of blocking a current path between the electrical ground 113 and the transformer neutral 111, to prevent damaging DC or quasi-DC ground currents in the transformer neutral 111, which would in turn cause possible generation of harmonics, damage to the transformer 110 or collapse of a power grid. In the example shown, the DC current blocking component 210 includes resistor 212 and one or more capacitor banks electrically connected in parallel. In the example shown, a single capacitor bank 214 is shown, for simplicity. Although in the example shown capacitors included in the capacitor bank 214 are electrically connected in parallel, it is recognized that not only would capacitor banks be electrically connected in parallel, individual capacitive elements within a capacitor bank may be connected either in series or in parallel with each other to form such a bank.

Although in certain embodiments a one or two Ohm impedance (60 Hz) capacitance bank is used, other types of capacitors could be used as well. However, depending on the specific application, either a capacitive or resistive (or some combination thereof) blocking device could be employed in the electrical protection circuit 200. Furthermore, the DC current blocking component 210 is hard wired to the electrical ground 113, therefore providing an alternating current (AC) ground for the transformer (or other power component) even if the DC switch 204 and alternating current (AC) switch 208 inadvertently malfunction.

As noted above, the electrical protection circuit 200 is operable in at least two different modes. In particular, a switch assembly 202, including the DC switch 204 and the alternating current (AC) switch 208, are normally in a closed position, and open in the case of a potentially damaging DC or quasi-DC current at the transformer neutral, such as a large current that may flow through the switch assembly 202 to ground. In that same mode, the switch assembly may be configured to remain open in the event of very large voltages, to avoid high current events upon reclosing the circuit. In a second mode, the switch assembly may operate in a normally open position, and may close only in the event of a determination that it would be advantageous to discharge voltage from the transformer neutral. In such instances, similar events that would trigger the switch assembly to open could override a determination to close the switch assembly, thereby maintaining the switch assembly in an open position. Such modes are managed, as discussed below, via a controller, such as controller 112 or controller 302, as discussed further below. In other embodiments the switch assembly 202 may be a single DC switch or an AC switch.

When operating in a first possible mode, the transformer neutral 111 is, by default, grounded through both the switch assembly 202 and the DC current blocking component 210. That is, the switch assembly 202, including the DC switch 204 and the alternating current (AC) switch 208, is normally in a closed position. This corresponds to the standard grounding configuration used by utilities; consequently, a grounding system such as is disclosed herein does not require readjustments to the utility electrical equipment to which it is attached prior to use. In this first mode of operation, the DC current blocking component 210 is not energized, because the switch assembly creates a short around it. If a ground fault is detected while operating in this normal operational mode (e.g., no GIC detected), the grounding through the switch assembly will handle the ground fault current until the power system relays isolate the faulted equipment. As described in greater detail below, when the presence of various conditions are detected within the electrical protection circuit 200, the switch assembly is opened by the controller 112. In this state, the DC current blocking component 210 provides the alternating current (AC) grounding for the transformer neutral. This protects against DC or quasi-DC currents associated with either GMD and HEMP-E3 events. This protective operation state remains operational until the controller 112 closes the switch assembly 202 as described in greater detail below.

When operating in a second possible mode, the transformer neutral 111 is, by default, disconnected from the solid metallic path to ground 113 by the switch assembly 202 leaving the transformer AC grounded through the power resistor in series with the capacitor bank. That is, the switch assembly 202, including the DC switch 204 and the alternating current (AC) switch 208, is normally in an open position. This corresponds to an alternative grounding configuration that is useable by utilities, depending on their preference. In this mode of operation, the DC current blocking component 210 provides AC grounding, but blocks DC current from flowing to ground. When particular other conditions are detected within the electrical protection circuit 200 (different from those noted above), the switch assembly is closed by the controller 112, to provide grounding of the transformer neutral 111. Details regarding events that would cause closure of the switch assembly are also provided in further detailed below.

In some embodiments, to account for the extremely unlikely event that a GMD (or HEMP-E3) and a ground fault occur simultaneously (in either of the operating modes mentioned above), an overvoltage protection device 216 is included in parallel with the switch assembly 202 and the DC current blocking component 210. In some embodiments, the overvoltage protection device 216 is configured to trigger at a voltage that is below the voltage level that would damage either the transformer 110 or the DC current blocking component 210. In this manner, the overvoltage protection device 216 operates to protect the DC current blocking component 210 from potentially damaging voltages when the electrical protection circuit 200 is operating in the GIC blocking mode. In some embodiments, in the first mode of operation, the switch assembly 202 is then reclosed by a signal from the controller 112, based on detecting a current passing through the overvoltage protection device 216. Therefore, the overvoltage protection device 216 provides an initial grounding within one cycle of the ground fault and until the switch assembly 202 can be reclosed.

In this example, the overvoltage protection device 216 includes a triple spark gap 218. Examples of spark gaps are described in U.S. Pat. No. 9,660,441, titled OVERVOLTAGE PROTECTION FOR POWER SYSTEMS, the disclosure of which is hereby incorporate by reference in its entirety. In other embodiments, the overvoltage protection device 216 comprises a single spark gap. Further, in some embodiments, the overvoltage protection device 216 may comprise a surge arresting component disclosed in U.S. Ser. No. 14/185,458, a varistor, etc. In some embodiments, the controller 112 counts the number of events in which the overvoltage protection device 216 has operated to determine when inspection or replacement is required.

In some embodiments, a maintenance bypass switch 220 is included that operates to deactivate the electrical protection circuit 200 by connecting the transformer neutral 10 directly to electrical ground 113. Examples of maintenance bypass switch 220 include trapped key interlocks such as kirk key interlocks. In this manner, the electrical protection circuit 200 may be removed from operation for inspection, maintenance, repair, etc.

By opening the switch assembly, the DC current blocking component 210 shown in FIG. 2 provides the alternating current (AC) grounding path for the transformer neutral 111, while at the same time blocking the DC or quasi-DC currents induced by a geomagnetic storm or HEMP-E3 event. Blocking the quasi-DC currents protects the transformer 110 from entering half-cycle saturation which in-turn can cause transformer excessive reactive power losses, overheating, damage, or even failure. Additionally, blocking the quasi-DC current also prevents the generation of harmonics in the power system which in-turn can prevent the tripping of relays, the disconnection of power compensation components, excessive reactive power burden, and potentially the collapse of either small or large portions of the power grid.

Further, to increase the reliability of the DC current blocking component 210, either a parallel bank of multiple capacitors or resistors could be used such that if one or more of these capacitors or resistors fail the others would still be available as blocking components.

Additionally, to protect against the E1 and E2 portions of a high altitude electromagnetic pulse (HEMP) and/or Intentional Electromagnetic Interference (IEMI), some or all of the sensitive sensing and control electronics of such a system can be placed in a shielded and electrically filtered enclosure, such as the enclosure containing controller 112 of FIG. 1. In some embodiments, only components that do not contain sensitive semiconductor electronics are not housed in the enclosure and hence would survive either an EMP or IEMI event. In an alternative embodiment where the controller 112 is not placed in a shielded and electrically filtered enclosure, the transformer will still be protected against geomagnetic and HEMP E3 induced currents. Additional details regarding the contents of such an enclosure are discussed in further detail below.

It is noted that alternative embodiments of such an electrical protection circuit 200 may be utilized as well, in different embodiments of the present disclosure. Example embodiments are further described in U.S. Pat. Nos. 8,878,396 and 8,537,508, the disclosures of which are hereby incorporated by reference in their entireties.

Referring now to FIG. 3, a continuous grounding system 300 is shown including the electrical protection circuit 200, according to a possible embodiment of the present disclosure. The continuous grounding system 300 also includes a controller 302, in accordance with a possible embodiment of the present disclosure. The controller 302 can generally correspond to controller 114 described above, and includes control electronics, such as a control module 304, as well as one or more sensing devices. In the example shown, the controller 302 includes the following sensing devices: a GIC measurement device 306, a current transformer (CT) 308, a current transformer (CT) 310, a current transformer (CT) 312, a neutral current sensor 314, and a voltage probe 316. Some embodiments include more, fewer, or different sensing devices. In some embodiments, the neutral current sensor 314 is a Rogowski Coil. The above mentioned GIC measurement devices, current transformers, and current sensors are example of current probes. The above-mentioned sensing devices, including the current probes and voltage probes, are examples of measurement probes.

In some embodiments, the control module 304 comprises a special purpose computing device that operates to receive signals from the various sensing devices, and continuously monitor voltage and current levels within the circuits described herein, as noted above. In some situations, the control module 304 is configured to perform various tests based, at least in part, on the received signals, and control the switch assembly 202 accordingly. An example special purpose computing device is the SEL Axion® Distributed Control and Integration Platform from Schweitzer Electronics Laboratory of Pullman, WA. In the example shown, the control module 304 includes a processing device 318, a memory device 320, an alarm device 322, and a switch control device 324. Some embodiments include additional components as well such as a network interface device that operates to communicate with other computing devices over one or more networks.

The processing device 318 includes one or more physical integrated circuits that selectively execute instructions such as software instructions. In various embodiments, the processing device 318 is implemented in various ways. For instance, in one example embodiment, the processing device 318 is implemented as one or more processing cores. For instance, in this example embodiment, the processing device 318 may be implemented as one or more Intel Core 2 microprocessors. In another example embodiment, the processing device 318 is implemented as one or more separate microprocessors. In yet another example embodiment, the processing device 318 is implemented as an ASIC that provides specific functionality. In yet another example embodiment, the processing device 318 provides specific functionality by using an ASIC and by executing software instructions. Additionally, in some embodiments the processing device 318 comprises a digital signal processor. In different embodiments, the processing device 318 executes software instructions in different instruction sets. For instance, in various embodiments, the processing device 318 executes software instructions in instruction sets such as the x86 instruction set, the POWER instruction set, a RISC instruction set, the SPARC instruction set, the IA-64 instruction set, the MIPS instruction set, and/or other instruction sets. For example, the processes illustrated and described below may be executed by the processing device 318 as software instructions.

The memory device 320 includes one or more computer-readable data storage media capable of storing data or instructions or both. In different embodiments, the memory device 320 is implemented in different ways. For instance, in various embodiments, the memory device 320 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data. In some embodiments, the memory device 320 includes non-transitory media.

The alarm device 322 operates to generate an alarm in response to an alarm condition. In some embodiments, the alarm device 322 transmits a message to a remote computing device such as a supervisory control and data acquisition (SCADA) system in response to an alarm condition. In some embodiments, the alarm device 322 supports multiple alarm severity levels (e.g., minor alarm and major alarm) and operates differently according to the severity level of a particular alarm condition. Additionally, in some embodiments the alarm device 322 operates to log alarm conditions, such as to a file, database table, or memory location.

The switch control device 324 operates to control the switch assembly 202. In at least some embodiments, the switch control device 324 comprises a relay that opens and closes the switch assembly 202. The switch control device 324 is operable by the processing device 318 to operate the switch assembly 202 in accordance with one of the two default modes described above.

In the example shown, the controller 302 is further connected to an electromagnetic field detector 330. The electromagnetic field detector 330 may be configured to detect electromagnetic field events in proximity thereto, and provide a signal to the controller 302. One example of such an electromagnetic field detector 330 is described in U.S. Pat. No. 8,860,402, entitled "ELECTROMAGNETIC FIELD DETECTION SYSTEMS AND METHODS" the disclosure of which is hereby incorporated by reference in its entirety.

Figure 4:
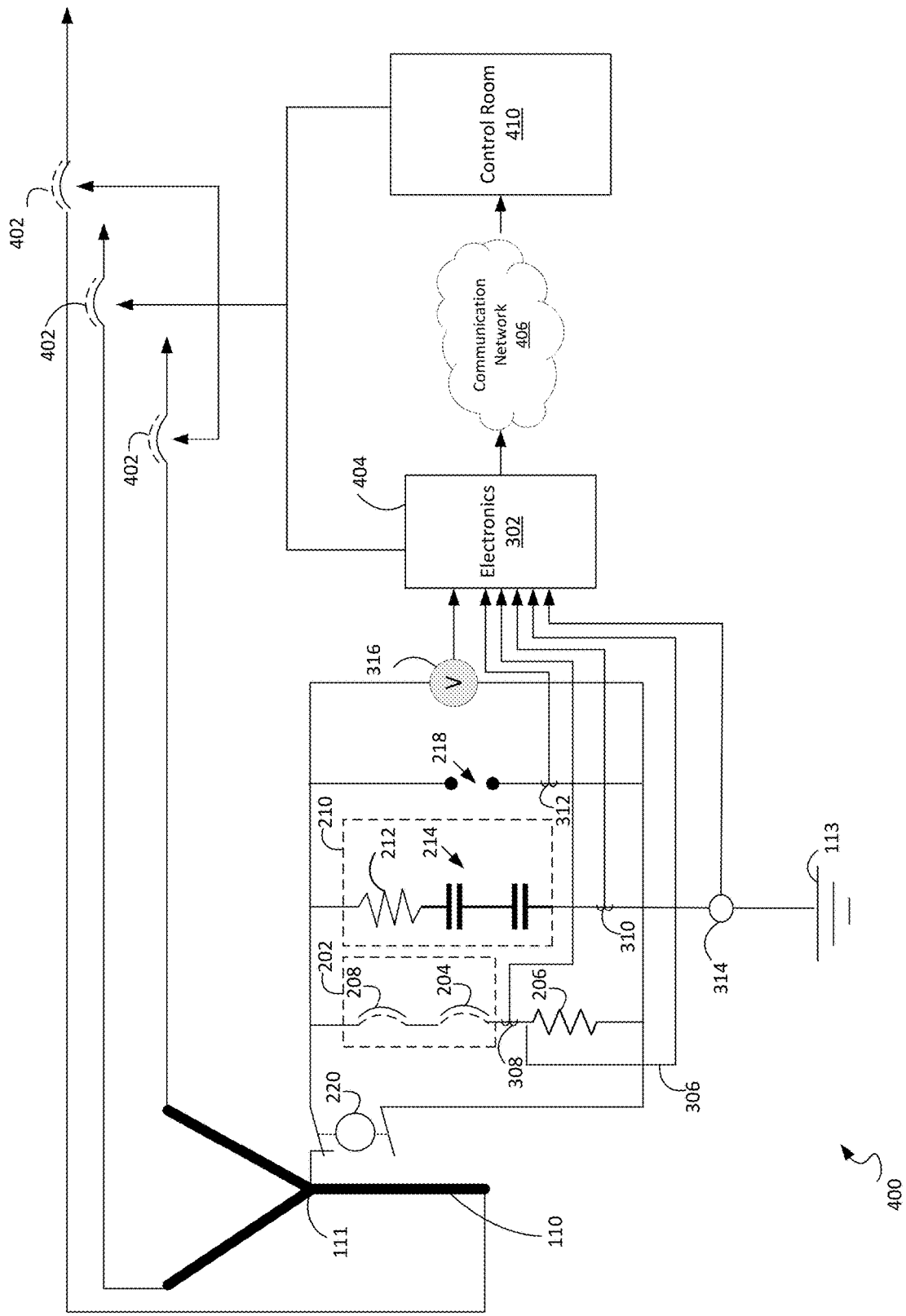
FIG. 4 is a schematic diagram of a further transformer protection circuit operable in conjunction with the control system described herein.

FIG. 4 is a schematic diagram of a further transformer protection circuit 400 operable in conjunction with the control system described herein. The transformer protection circuit 400 of FIG. 4 generally corresponds to the continuous grounding system 300, including electrical protection circuit 200 of FIG. 3. However, in the example shown, a set of circuit breakers 402 are placed on each of the phase lines electrically connected to the transformer 110. The circuit breakers 402 may be remotely or locally actuated to remove the transformer 110 from a larger electrical system, such as the power grid.

In the example shown, the controller 302 may be located within a shielded enclosure 404, and communicatively connected to a remote control room 410 via a communication network 406. That is, the control room 410 may be located remotely from the controller 302, and either may operate to determine a current status of the protection circuit electrically connected between the transformer neutral 111 and ground 113, and also each may be configured to actuate the switch assembly 202, or any of circuit breakers 402.

Figure 5:
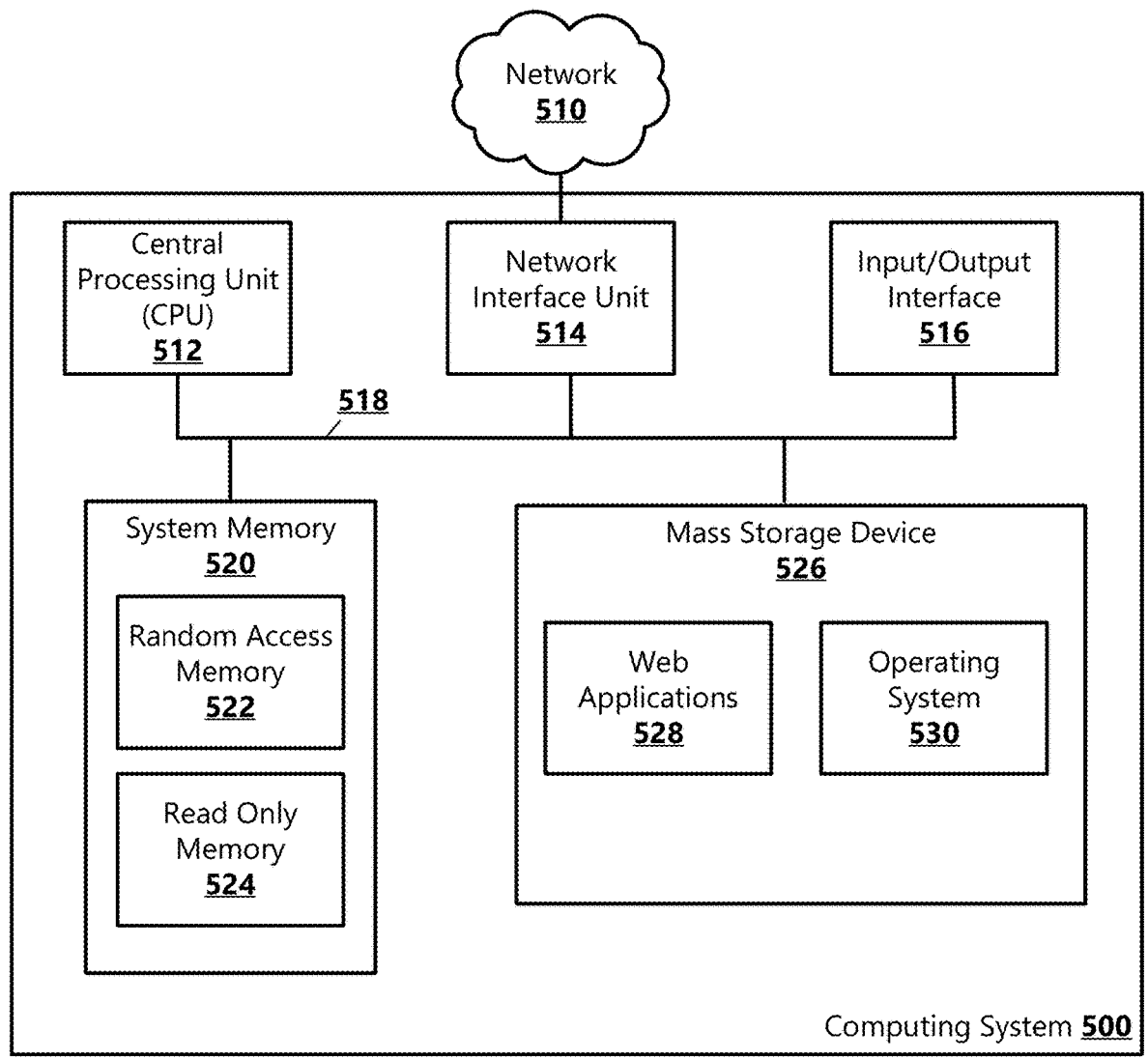
FIG. 5 is a block diagram of an example computing system with which aspects of the present disclosure can be implemented.

FIG. 5 is a block diagram of an example computing system with which aspects of the present disclosure may be implemented, in particular the remote control and coordination system 150. In the embodiment shown, the computing system 500 includes at least one central processing unit ("CPU") 512, a system memory 520, and a system bus 518 that couples the system memory 520 to the CPU 512. The system memory 520 includes a random access memory ("RAM") 522 and a read-only memory ("ROM") 524. A basic input/output system that contains the basic routines that help to transfer information between elements within the computing system 500, such as during startup, is stored in the ROM 524. The computing system 500 further includes a mass storage device 526. The mass storage device 526 is able to store software instructions and data.

The mass storage device 526 is connected to the CPU 512 through a mass storage controller (not shown) connected to the system bus 518. The mass storage device 526 and its associated computer-readable storage media provide non-volatile, non-transitory data storage for the computing system 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 512 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 500.

According to various embodiments of the invention, the computing system 500 may operate in a networked environment using logical connections to remote network devices through a network 510, such as a wireless network, the Internet, or another type of network. The computing system 500 may connect to the network 510 through a network interface unit 514 connected to the system bus 518. It should be appreciated that the network interface unit 514 may also be utilized to connect to other types of networks and remote computing systems. The computing system 500 also includes an input/output controller 516 for receiving and processing input from a number of other devices, including a touch user interface display screen, or another type of input device. Similarly, the input/output controller 516 may provide output to a touch user interface display screen or other type of output device.

As mentioned briefly above, the mass storage device 526 and the RAM 522 of the computing system 500 can store software instructions and data. The software instructions include an operating system 530 suitable for controlling the operation of the computing system 500. The mass storage device 526 and/or the RAM 522 also store software instructions 528, that when executed by the CPU 512, cause the computing system 500 to provide the functionality discussed in this document. For example, the mass storage device 526 and/or the RAM 522 can store software instructions that, when executed by the CPU 512, cause the computing system 500 to provide remote monitoring of a protection circuit such as the circuits 112, 200 described above, and remote communication with and adjustment of default settings associated with a controller 114, 302.

FIGS. 6A-6B are schematic diagrams of a power grid illustrating induced voltages between transformers at substations in the presence of direct current blocking at transformer neutrals across such a power grid. FIG. 6A illustrates a first arrangement 600 in which a plurality of transformers at various substations are distributed, distanced apart from each other within a power grid. In the example shown, various transformers at different substations are shown schematically as 602, 604, 606, 608, 610 (collectively 602-610). In this example, the transformers at substations 602-610 are shown, for purposes of example, at a distance of approximately 200 km apart. Additionally, the transformer at substation 602 has a neutral blocker 612 activated, thereby disconnecting the DC grounding point of the transformer at station 602.

In this simplified example, in the event of a GMD/EMP event having a field strength of 20 volts per kilometer (V/km), a total voltage of 4,000 VDC may be induced at a transformer neutral within this power grid. This is determined, for example, using the field strength of 20 V/km and multiplying it by the length of the antennae (in this case the length of transmission line, or distance between DC grounding points).

Referring to FIG. 6B, a second arrangement 650 is shown, including the transformers at substations 602-610. In this example, all of the transformers at substations 602-610 have a neutral blocker activated (shown as neutral blockers 612, 614, 616, 618, 620). Accordingly, the same induced voltage of 20 V/km could induce up to 16,000 VDC. Additionally, when such blocking is in place on a power grid, and induced DC voltage of 5 V/km could result in up to 4,000 VDC at a given station. This is due, at least in part, to an effective lengthening of an antenna formed by the power grid by increasing the distance between DC grounding points with the use of neutral blockers, thereby providing a linear increase in induced voltage.

As a result of the potential for increased induced DC voltages at transformer stations based on introduction of neutral blocking systems, it may be the case that a direct current voltage at a particular transformer within a power grid may be far higher than might otherwise be expected, due to interactions or interrelationships among multiple transformers or transformer substations within the power grid. Accordingly, additional methods of protection may be advisable to be introduced. In some instances, a combination of introduction of a neutral blocker and disconnection of a transformer from the power grid, or segmenting a power grid (due to actuation of circuit breakers on phase lines of the power grid that are connected to high voltage transformers) may be used to shorten power grid antenna lengths, and thereby reduce induced voltage that may otherwise cause damage to power grid equipment.

In some example implementations, there may also be a need for the neutral blocking device to automatically alter its blocking strategy in the presence of high DC voltages or in an EMP scenario during war. It may no longer be the best decision to close a switch assembly (such as the switch assemblies seen in FIGS. 1-4, above) in the presence of high dc voltages (e.g. if AC imbalance is too high, if AC TOV is exceeded or there is a fault). It may be preferable in this scenario to override the trigger to close the switch assembly and to keep the switch assembly open and/or open the phase breakers to ensure the transformer is protected. The power grid can handle very high DC voltages (on the order of 15,000-35,000 volts DC) which is determined by the neutral insulation limit of the transformer. The power grid cannot, however, handle high DC current. While it can handle at least 15,000 volts DC, it may take a little as 5 Amps DC/phase to cause a transformer to begin to half cycle saturate, generate harmonics, vibrate, consume more VARs, or otherwise operate outside of typical operating parameters and therefore potentially cause equipment damage or misoperation. Therefore, in some circumstances, it makes sense to block DC currents immediately (no matter how small) and let the DC voltage levels rise as a particular induced current event (e.g., a GIC event) occurs. Closing the switch assembly in the presence of high DC voltage would result in high DC currents flowing through the transformer neutral, which should, in many circumstances, be avoided.

Figure 7:
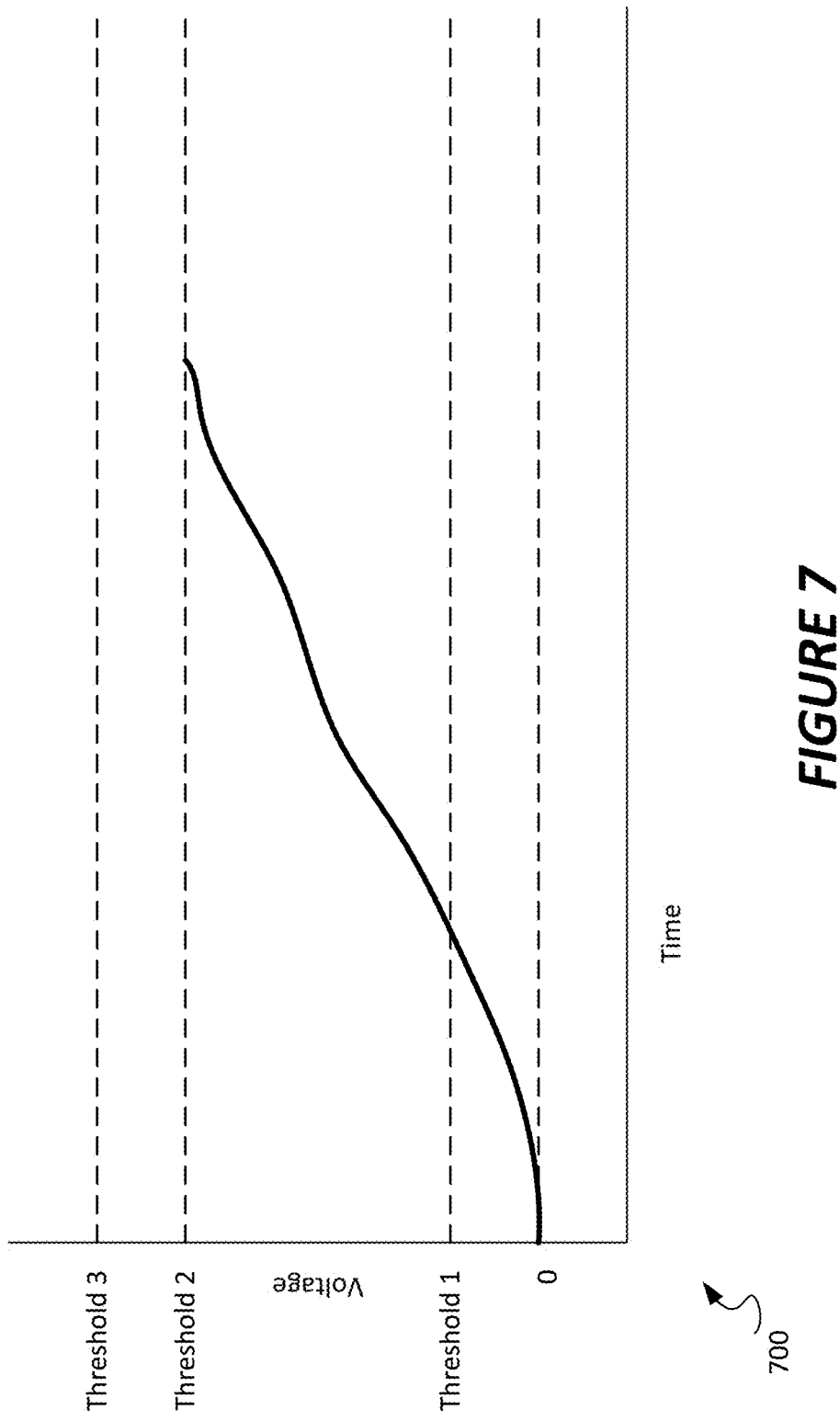
FIG. 7 is a chart illustrating example operation of a transformer protection circuit at varying voltage thresholds, in accordance with an example embodiment.
Figure 8:
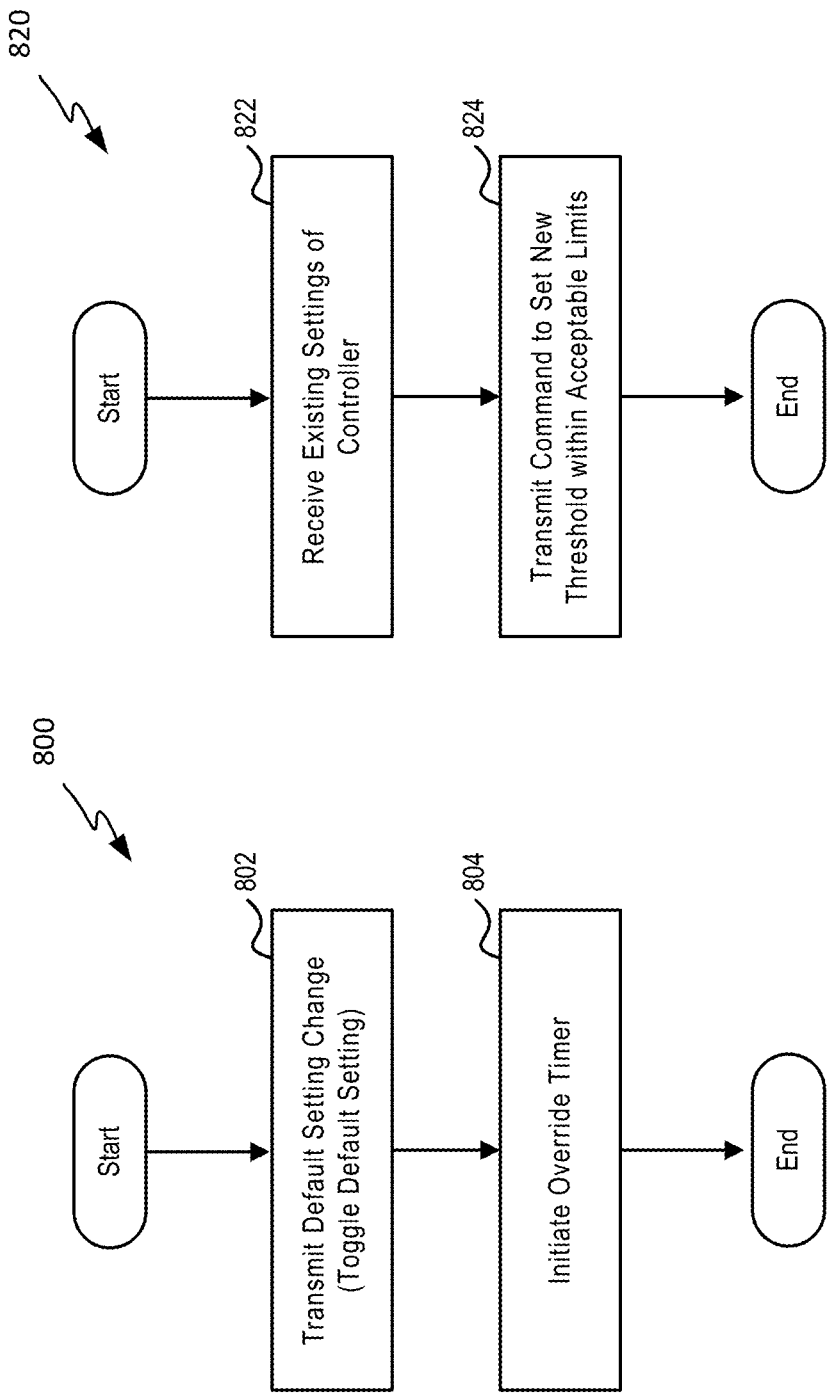
FIG. 8A is a flowchart of an example method of operating a control circuit that is useable in conjunction with a transformer protection circuit to remotely adjust default operational settings of the transformer protection circuit.
FIG. 8B is a flowchart of an example method of operating a control circuit that is useable in conjunction with a transformer protection circuit to remotely adjust operating parameters of the transformer protection circuit within acceptable limits.

FIG. 7 is a chart 700 illustrating example operation of a transformer protection circuit at varying voltage thresholds, in accordance with an example embodiment. The chart 700 illustrates an example of a set of thresholds at which different combinations of neutral blocking and electrical phase line disconnection might be used to avoid damage to power grid components.

In the example shown in the chart 700 includes a series of voltage thresholds that may be monitored, with different actions being taken upon reaching the various thresholds. In the example shown, three separate thresholds are used; however, in alternate embodiments, more or fewer thresholds may be used as well. As illustrated, a first threshold may be set such that, below that threshold, any DC voltage that occurs or is seen at a transformer neutral might be caused by relatively small geomagnetic disturbance (GMD) events. In such instances, the event causing induced DC voltage may be relatively localized, and will not cause a significant induced voltage. Accordingly, such a threshold may be set at a relatively low level, such as below 500 Volts DC, for example, at 225 V DC. In some examples, a different voltage, such as below 1000 Volts DC, could be used as the threshold.

In this range, if a particular alarm condition is detected and a DC voltage is present (below the threshold), a switch assembly may be either closed if maintained in default open position, or may be maintained as closed. This will have the effect of allowing the DC voltage to be dissipated by routing the transformer neutral directly to ground. Alarm conditions may include, for example: detection of an AC fault current, an AC imbalance being greater than a predetermined threshold, at current transformer 310; detection of an overvoltage protection device triggering, at current transformer 312; or detection of an AC voltage above a threshold at a voltage probe 316; also, detection of disconnection of a neutral, e.g., based on a combination of signals from the Rogowski coil and voltage probe.

Generally speaking the first threshold may be selected based on electrical characteristics of the transformer and/or circuit to which a transformer neutral is connected. In some examples, the threshold that is selected corresponds to a DC current representing a potential thermal damage limit of the transformer (i.e., a current that would flow through the transformer to ground given the DC voltage and circuit characteristics).

In the case of an event occurring during a time in which DC voltage exceeds the first threshold, but is lower than a second threshold, an alarm may similarly be actuated, e.g. for similar events. The second threshold, referred to as "Threshold 2" in FIG. 7, may be selected such that the threshold is below a maximum voltage acceptable for a neutral blocker within an electrical protection circuit, such as the capacitive elements described above. In this instance, if an alarm condition occurs that is analogous to those previously described, a neutral blocker will not close, but instead remain open. Additionally, phase breakers 402 may be opened on the power line phases associated with a transformer 110. In such an instance, because closing a switch assembly would result in significant DC current passing through the transformer neutral to ground (which may otherwise cause damage to the transformer), switching the switch assembly to a closed configuration is not preferred. By instead maintaining the switch assembly in an open position and additionally opening breakers 402, the transformer 110 is safely removed from the source of DC current.

In the case that voltage approaches or would potentially exceed the second threshold, and be below a third threshold, referred to as "Threshold 3" in FIG. 7, the controller 302 may indicate to open the phase breakers 402. That is, the second threshold is selected such that it is below the third threshold, and ensures that a voltage at the transformer neutral does not reach the third threshold. The third threshold generally corresponds to a safety threshold, or operating threshold, of a DC blocking component included within the electrical protection circuit. Accordingly, this is not a threshold that is desirable to be reached by a voltage at the transformer neutral. By selecting a second threshold below the third threshold, and actuating breakers on the phases of the transformer to disconnect the transformer from power transmission lines, a voltage may be prevented from reaching the third threshold, thereby causing damage.

II. Operation of Control System

Referring now to FIGS. 8-24, various methods of operation of a controller located in either remotely from or local to a transformer protection circuit are described. In some examples, the methods may be performed remotely to adjust a default operating mode in which a local controller operates. In other examples, and where noted below, the methods may be performed locally.

Referring first to FIGS. 8A-8B, two remote operation methods are described for adjusting operation of one or more controllers and associated electrical protection circuits. In FIG. 8A, a method 800 includes transmitting a default setting change from the remote control and coordination system 150 to a controller associated with an electrical protection circuit (step 802). The default setting change may include a change to instruct the controller, such as controller 114 at one or more locations 102 of FIG. 1, to switch between a first and second operating mode. For example, a first operating mode may correspond to operation of a circuit 200 with a switch assembly 202 in a default closed position. A second operating mode may correspond to operation of the circuit with the switch assembly 202 in a default open position. In either of these modes, various opening and closing conditions (described in Parts III-V, below) may be triggered, causing opening and/or closing of the switch assembly if no other enable/disable operations are set and no hazard conditions detected. In some embodiments, the switch to a default setting may select a third mode, such as an "always closed" mode, in which the switch assembly 202 is forced closed and does not reopen in the event of any of the events detected in conjunction with Part IV, below. In some embodiments, the switch to a default setting may select a fourth mode, such as an "always open" mode, in which the switch assembly 202 is forced open and does not close in the event of any of the events detected in conjunction with Part III, below.

The method 800 further includes initiating an override timer (step 804). The override timer may define a period of time within which another default setting change may not be transmitted to the same controller 114. In the example embodiments, the override timer may be selected to define a period, such as 5 seconds to 5 minutes, within which the default setting may not be reversed. This prevents use of the remote control and coordination system 150 to quickly toggle a switch assembly 202 of a protection circuit by quickly changing the operating mode of a controller 114 while the protection circuit 112, 200 has not detected a problematic condition from among those described below. For example toggling between an always closed mode and a default open mode may result in toggling of the switch assembly absent such a timeout period. By inserting such delay, wear on the switch assembly may be reduced.

Notably, the controller 114 will continue, during the period, to respond to problematic events detected at the transformer neutral 111 or within the electrical protection circuit 112, 200 generally. Specifically, as described below, the controller 114 will continue to initiate opening or closing of a switch assembly, regardless of the operating mode of that switch assembly, in response to the specific voltage, current, or electromagnetic signal events that may cause damage to the transformer or protection circuit.

Although the method 800 is described relative to a single protection circuit, the remote control and coordination system 150 may communicate with any or all of the controllers 114, such that all electrical protection circuits may be placed in the same mode at the same time, or each electrical protection circuit may be placed in a different mode individually. Furthermore, the override timer identified above is specific to each electrical protection circuit individually to control a maximum rate of switching of an individual switch assembly (e.g., due to changing the default settings).

FIG. 8B illustrates a second possible method 820 for remote adjustment of operation of an electrical protection circuit, e.g., from remote control and coordination system 150. In the embodiment shown, the method 820 includes receiving existing settings of a controller of the electrical protection circuit, e.g., from controller 114 (step 822). The existing settings can include, for example, one or more thresholds at which the controller 114 is configured to actuate the switching assembly of the circuits described above. The one or more thresholds may include a direct current voltage threshold, an alternating current voltage threshold, an alternating current threshold, or thresholds regarding duration of such signals or fast changing rise times of such signals. Harmonic distortion thresholds may be set as well.

In this context, it is noted that a range of acceptable thresholds may be maintained at either the controller 114, at the remote control and coordination system 150, or both. Accordingly, in example embodiments, the method 820 further includes transmitting a command from the remote control and coordination system 150 to the controller 114 to change one or more of the thresholds (step 824). Notably, the updated threshold reflected by the command is maintained within the range of acceptable thresholds. If such threshold ranges are maintained at the remote control and coordination system 150, that system will disallow a user from adjusting a threshold to be outside that range. If such threshold ranges are maintained at the controller 114, although the remote control and coordination system 150 might transmit a command to adjust the threshold outside the range, the controller 114 will reject commands with unacceptable values, or at least adjust to a nearest value within the acceptable range.

This remote adjustment of thresholds allows any power utility to modify operation of a large number of electrical protection circuits conveniently, while ensuring that an appropriate amount of protection remains in place for the equipment that is located in the field (e.g., at the transformers).

As noted above, the thresholds may include voltage and current thresholds, as well as thresholds regarding rise time of voltage or current, elapsed time at a particular voltage or current level, or total harmonic distortion. Example threshold ranges may include:

- For Geomagnetically-Induced Current (GIC) or Direct Current above 1 to 100 amps, a triggering event may occur.
- For Geomagnetically-Induced Current (GIC) or Direct Current above 1 to 100 amps for times adjustable between 1 and 100 seconds, a triggering event may occur.
- For total harmonic distortion (THD) above 0.5%-10%, a triggering event may occur.
- For total harmonic distortion (THD) above 0.5%-10% for an adjustable amount of time between 1 and 100 seconds, a triggering event may occur.
- For Direct Current voltage between 1 and 1000 millivolts (DC), a triggering event may occur.
- For Direct Current voltage between 1 and 1000 millivolts (DC for an adjustable amount of time between 1 and 100 seconds, a triggering event may occur.
- For Direct Current voltage below 1 to 100 volts DC, and total harmonic distortion below 0.5%-10%, maintained for an adjustable time between 1 and 3,600 seconds, an event may occur to remove the electrical protection circuit from a blocking, or protective, mode.

Other voltage or current levels may be used as well at other adjustable time ranges; the above are merely exemplary and not intended as limiting on the invention or any claims included herewith.

Figure 9:
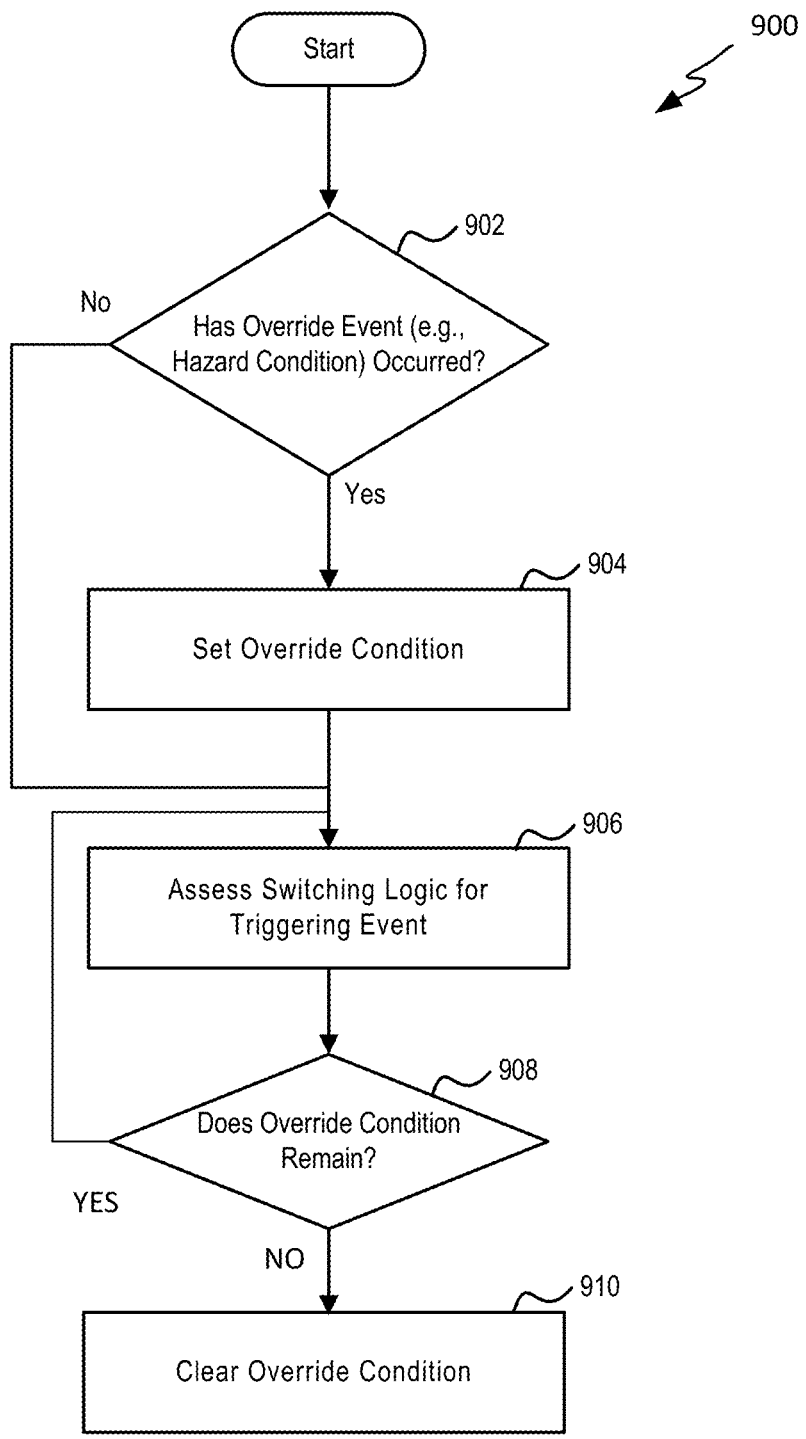
FIG. 9 is a flowchart of an example method of operating a control circuit that is useable in conjunction with a transformer protection circuit to override normal operation of the transformer protection circuit in the case a catastrophic event occurrence is detected.

FIG. 9 illustrates a further method 900 for operating an electrical protection circuit, for example using a controller 114, 302. In this example, an override event is detected, which represents an event for which, regardless of the default operating mode of the electrical protection circuit, the electrical protection circuit should be placed in a blocking arrangement in which a switch assembly remains open. For example, the blocking arrangement may be used to protect a transformer from an inrush current stemming from high direct current during a solar storm or electromagnetic event (E3). Additionally, the override protects the switch assembly itself in the event of any voltage rating of the switch assembly being exceeded continuously while attempting to disconnect a high DC current connected to ground.

In the example shown, the method 900 determines if an override event, such as a hazard condition, has occurred (step 902). Such an override event generally corresponds to in the event for which direct current blocking should it occur, regardless of other conditions which may be present within the transformer or related electrical protection circuit. For example, if a predetermined amount of time has been exceeded at which a voltage at the transformer neutral is above a predetermined threshold, it may be determined that a switch assembly would otherwise close. Alternately, if an overvoltage protection device is actuated, it may be determined that a switch assembly should close. However, such triggering events should, if a hazard condition exists, not cause closure of a switch assembly, because of the hazard condition. Hazard conditions may include, for example, a direct current voltage at a transformer neutral that exceeds any second threshold that is higher than the predetermined threshold. Additionally, a hazard condition may include an electromagnetic pulse event, such as an E1 event (e.g., detected at a detector 310, as seen in FIG. 3) of which is indicative of a potential E3 pulse event (i.e., a damaging electromagnetic interference or EMP event). Further, a hazard condition may include a geomagnetically induced current or HEMP-E3 induced current having a fast rise time, such as a rise time of less than 10 seconds (can be on the order of milliseconds).

In the case that an override event has occurred, an override condition will be set in the local controller software (step 904). This override condition will prevent the switch assembly from being closed during the presence of the override condition. The controller will then continue to monitor for triggering events (step 906). Example triggering events that would cause closure of the switch assembly are described in further detailed below, but include those previously mentioned.

As noted above, although discussed as occurring at a particular location 102, because of the geographically dispersed nature of electrical equipment including transformers 110, but the electrical interconnectedness of those transformers via the power grid, in some instances, detection of an override condition at a particular location may result in entering an override mode at other locations, by way of transmission of a message from one controller 114, 302 to other controllers 114, either directly or via the remote control and coordination system 150.

Once switching logic is assessed, in the embodiment shown, it is determined whether the override condition remains, or should be cleared (step 908). In example embodiments, this can be a determination of whether a voltage remains above a threshold (e.g., 75 V, or in some cases between 20-100 V or higher) at the transformer neutral, or has dropped below that set threshold for a predetermined amount of time. In the example shown, operation 908 determines whether a voltage reading at the transformer neutral has fallen below a threshold for a predetermined period of time. If so the override condition may be cleared (step 910) prior to subsequent reassessment of such override conditions and/or switch opening/closing events. If the override condition remains, operational flow returns to step 906, for assessing switching logic with the override condition set until the override condition has cleared.

III. Switch Assembly Closing Events ("Triggering Events")

Referring now to FIGS. 10-15, example events which may trigger closure of a switch assembly 202 (e.g., "triggering events"), such as the one seen in FIGS. 2-4, are described. These example events may be events for which a voltage or current discharge from a transformer neutral is desired, but which would not cause significant current (e.g., due to the voltages being relatively low, or not long lasting). They may also be events such as a return to a default closed switching assembly mode (e.g., the first possible mode of the two modes described above). In such cases, as described herein, switching to a closed state may be overridden based on detection of a hazard, or override condition, to ensure that large current does not flow through the protection circuit 112 to ground, thereby potentially damaging the transformer 110, the protection circuit 112, or both.

Figure 10:
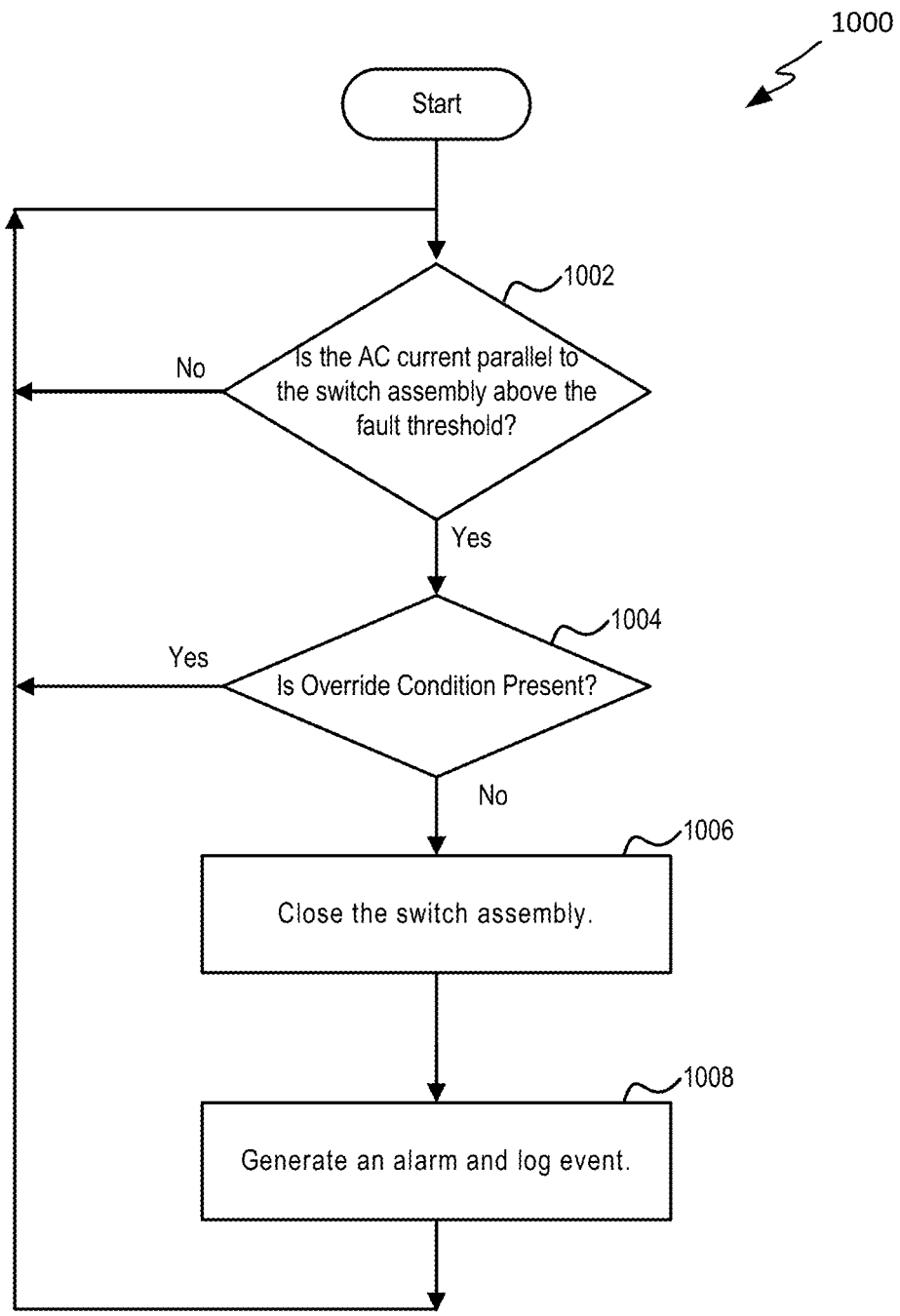
FIG. 10 illustrates an example process for detecting a potentially damaging fault current in the transformer neutral, according to a possible embodiment of the present disclosure.

Referring first to FIG. 10, an example process 1000 performed by some embodiments of a control system, such as controller 114 or controller 302, is illustrated. The test process 1000 operates to detect a ground fault while the system (e.g., any of systems 200, 300, 400) is operating in a blocking mode and, in response to detecting a ground fault, to close the switch assembly 202 and log the ground fault event. For example, the process 1000 tests the transformer neutral alternating current (AC) for ground fault events when the switch assembly 202 is open. In example embodiments, it is determined whether the alternating current (AC)

running parallel to the switch assembly 202 as measured by the current transformer (CT) 310 exceeds a predetermined fault threshold for one cycle (step 1002). In some embodiments, the predetermined threshold is 5,000 amps. If the current exceeds the threshold, it is determined whether an override condition is present (step 1004). An override condition may be, for example, any of the conditions noted above (high voltage, EMP detected, fast rate of change/rise time of the GIC), any of the conditions described with respect to FIG. 6, or described further below. If an override condition is present, then no switching event will occur, and the system (e.g., system 300, 400) will continue to monitor the circuit 200. However, if no override condition is present at step 1004, a signal is sent to close the switch assembly 202 (e.g., via switch control device 324) thereby giving the system a metallic path to ground and placing the system in a state in which the switch assembly is closed (e.g., either as a default mode or otherwise) (step 1006). In example embodiments, an alarm is generated and the event is logged as a ground fault (step 1008). Alternatively, if the current does not exceed the threshold at step 1002, the process repeats to continuously monitor the electrical protection circuit 200. Similarly, after completion of step 1008, the process 1000 also returns to step 1002 so as to perform continuous monitoring of the electrical protection circuit 200.

Figure 11:
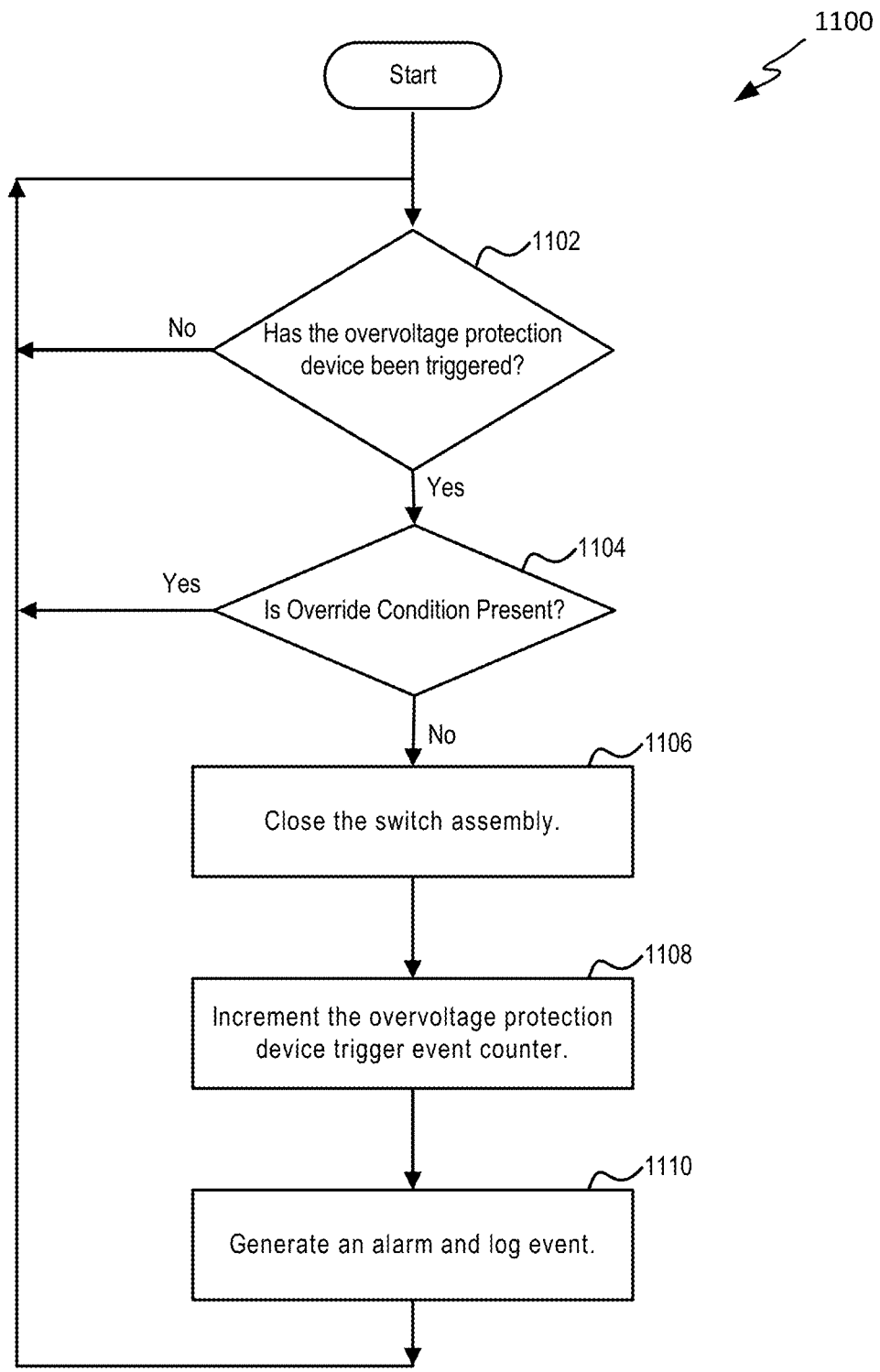
FIG. 11 illustrates an example process for determining whether an overvoltage protection device is triggered, such as when a higher voltage ground fault occurs according to a possible embodiment of the present disclosure.

Referring now to FIG. 11, an example test process 1100 performed by some embodiments of the controller 302 is illustrated. The test process 1100 operates to detect when the overvoltage protection device 216 is triggered, such as when a higher voltage ground fault occurs while the system 300 is operating in the GIC protective mode.

In example embodiments, it is determined whether the overvoltage protection device 216 has been triggered or operated based on whether the current measured at current transformer 312 exceeds a predetermined trigger threshold for one cycle (step 1102). In some embodiments, the predetermined threshold is 5,000 amps. If the current exceeds the threshold, it is determined whether an override condition is present (step 1104). An override condition may be, for example, any of the conditions noted above (high voltage, EMP detected, fast rate of change/rise time of the GIC) or respect to FIG. 6, or described further below. If an override condition is present, then no switching event will occur, and the system 300 will continue to monitor the circuit 200. However, if no override condition is present at step 1104, a signal is sent to close the switch assembly 202 (step 1106), thereby giving the system 300 a metallic path to ground and placing the system 300 in a state in which the switch assembly is closed.

In example embodiments, a counter of overvoltage protection device trigger events is incremented (step 1108). In some embodiments, the counter is used to determine when repair or maintenance may be needed on the overvoltage protection device 216. Subsequently, an alarm is generated (step 1110). In some embodiments, the event is logged as well. Alternatively, if the current does not exceed the threshold at step 1102, the process repeats step 1102 to continuously monitor the electrical protection circuit 200. Similarly, after completion of step 1110, the process 1100 also returns to step 1102 so as to perform continuous monitoring of the electrical protection circuit 200.

Figure 12:
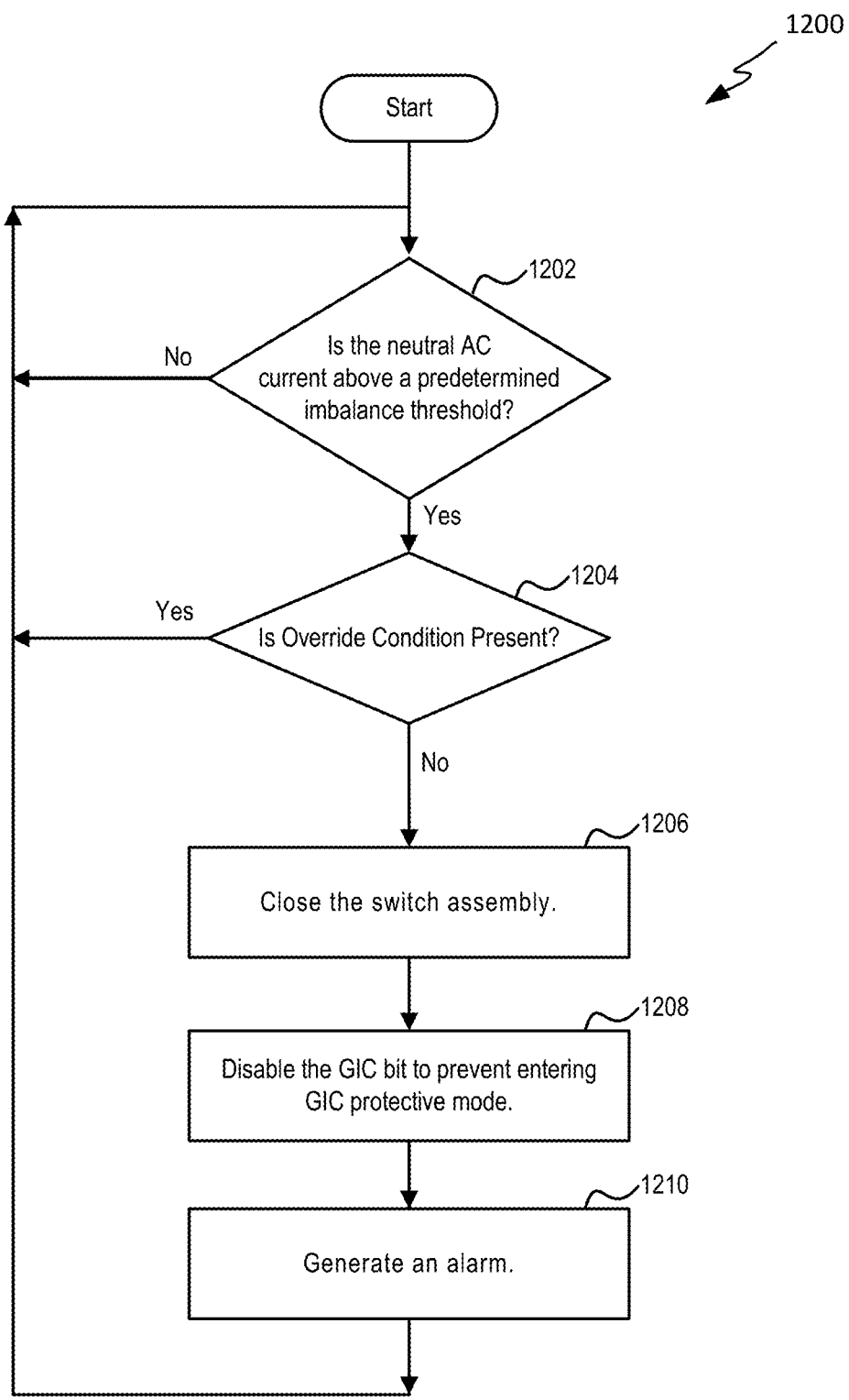
FIG. 12 illustrates an example process for ensuring imbalance alternating current (AC) in the transformer neutral is below levels that could damage the DC current blocking component of FIGS. 2-4, according to a possible embodiment of the present disclosure.

Referring now to FIG. 12, an example process 1200 performed by some embodiments of the controller 302 is illustrated. The process 1200 operates to detect AC current between the transformer neutral 111 and the electrical ground 113, for example, due to an imbalance alternating current (AC) in the power system which would show up in the neutral connection 111 of the transformer 110. This condition can occur with the switch assembly 202 open or closed. In this example, the switch assembly 202 is open.

In an example implementation, current transformer 310 would provide a level of AC Current through the DC blocking component 210 to a controller (e.g., controller 114, 302) (step 1202). If it is determined that there is an imbalanced AC current above a predetermined threshold over a predetermined amount of time (which may be set by the limit of the DC blocking component 210), the process continues to determine whether an override condition is present (step 1204). An override condition may be, for example, any of the conditions noted above (high voltage, EMP detected, fast rate of change/rise time of the GIC) or with respect to FIG. 6, or described further below. If an override condition is present, then no switching event will occur (an alarm may be generated), and the system 300, 400 will continue to monitor the circuit (e.g., circuit 200). However, if no override condition is present at step 1204, a signal is sent to attempt to close the switch assembly 202 (step 1206), thereby providing a metallic path to ground and placing the switch assembly 202 in a closed state (e.g., a normal state for operation in a normally closed mode, or to ground a normally-open transformer neutral to discharge such current). This action provides a bypass to ground alleviating the stress on the DC blocking component 210. Then, the GIC bit is disabled (step 1208) to prevent entering GIC protective mode (i.e. switch assembly 202 open) and an alarm is generated (step 1210).

In some instances (e.g., when operating in a normally-closed mode), at step 1208, a disable switch is operated to the disable position. In some embodiments, switch assembly 202 will not be actuated to enter the GIC protective mode when the disable switch is set to disable. Beneficially, the disable switch can be used to disable the protective mode when measurements indicate that the components used in the protective mode are not operational. At step 1210, an alarm is generated. In some embodiments, a major alarm is generated. Additionally, in some embodiments, the event is logged as well.

Figure 13:
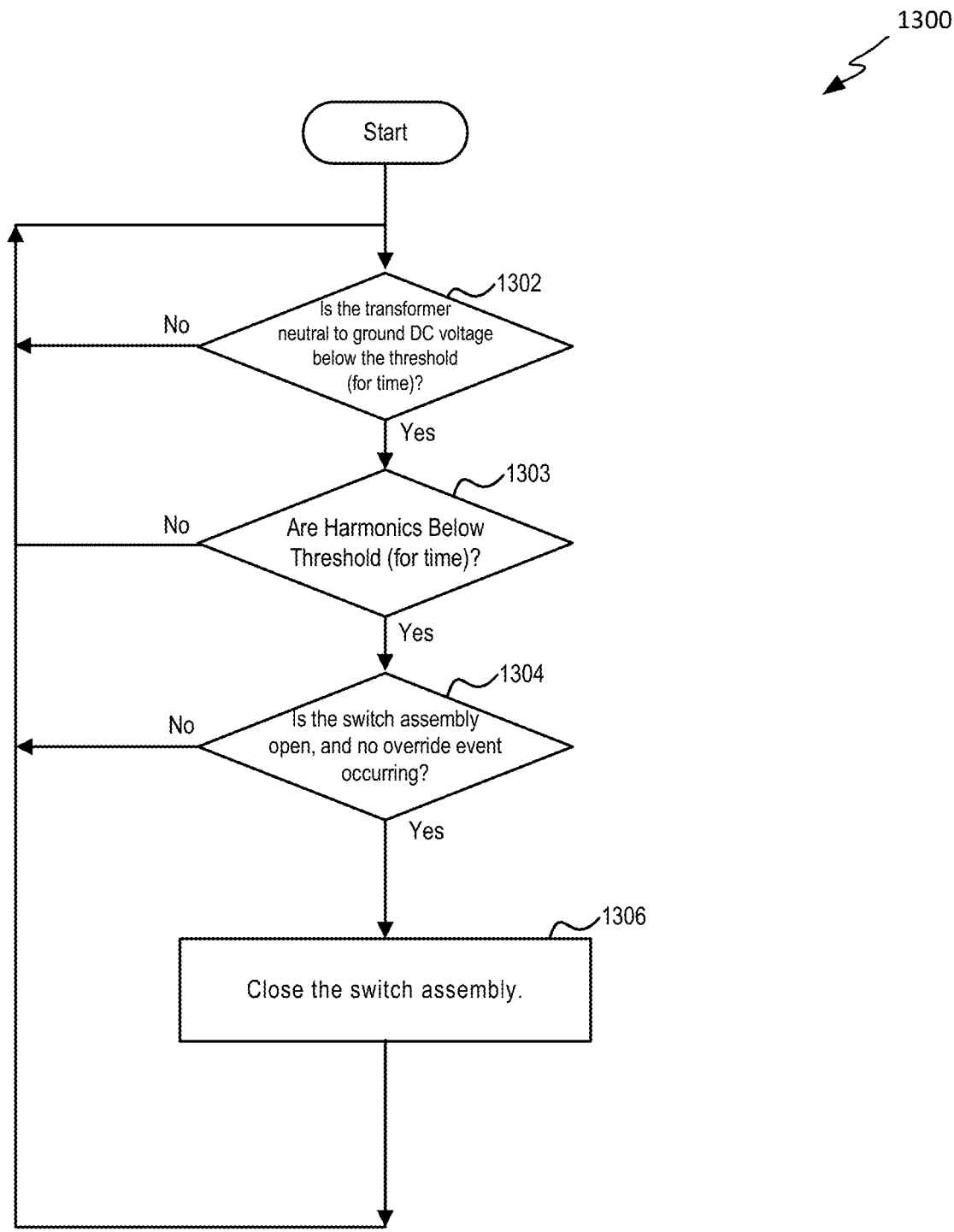
FIG. 13 illustrates an example process for determining whether a GIC event is over so that the control device of FIGS. 3-4 can close a switching assembly, according to a possible embodiment of the present disclosure.

Referring now to FIG. 13, an example process 1300 performed by some embodiments of the control device 302 is illustrated. The process 1300 operates to determine whether a GMD or EMP event is over so that the control device 302 can be safely transitioned to a closed position (e.g., "normal" operation according to one example operating mode). In example implementations, the transformer neutral to ground DC voltage as measured by voltage probe 316 is below a predetermined voltage threshold for at least a predetermined time period (step 1302). In some embodiments, the predetermined voltage threshold is 8 volts and the predetermined time period is 3600 seconds. This predetermined voltage threshold can be set at any level and time period preferred by the utility, and may be selected or adjusted by the utility. In examples, the predetermined voltage threshold is set such that if the switch assembly were closed, the voltage is sufficiently low such that any current that would pass to ground from the transformer neutral would not cause potential damage to the transformer; example thresholds are discussed herein.

In some examples, the process 1300 further includes monitoring harmonics on either the transformer neutral or on phases, and an assessment is made to determine whether such harmonics are below a predetermined threshold for at least a time period (step 1303). The time period may, in some examples, be the same time period as in step 1302, and optionally, the measurements of voltage and harmonics may be performed in parallel. For example, a total harmonic distortion threshold may be set at any level above 0.5%. A utility may choose to set the threshold at the IEEE limit for the individual voltage level of the transformer being protected.

If the above one or more thresholds is satisfied, it is determined whether the switch assembly 202 is open (i.e., that the system 300 is operating in the GIC protective mode), and whether no override event is otherwise occurring (step 1304). If the switch assembly 202 is open and there is no override event occurring, the process continues and a signal is sent to cause the switch assembly 202 to close, thereby returning the system 300 to its closed position (step 1306).

Alternatively, if the transformer neutral to ground DC voltage is not below the threshold at step 1302, the switch assembly 202 is determined to be closed, or an override event is detected at step 1304, then the process returns to step 1302 to continuously monitor the electrical protection circuit 200 without closing the switch assembly 202. Similarly, after completion of step 1306, the process 1300 also returns to step 1302 so as to perform continuous monitoring of the electrical protection circuit 200.

Figure 14:
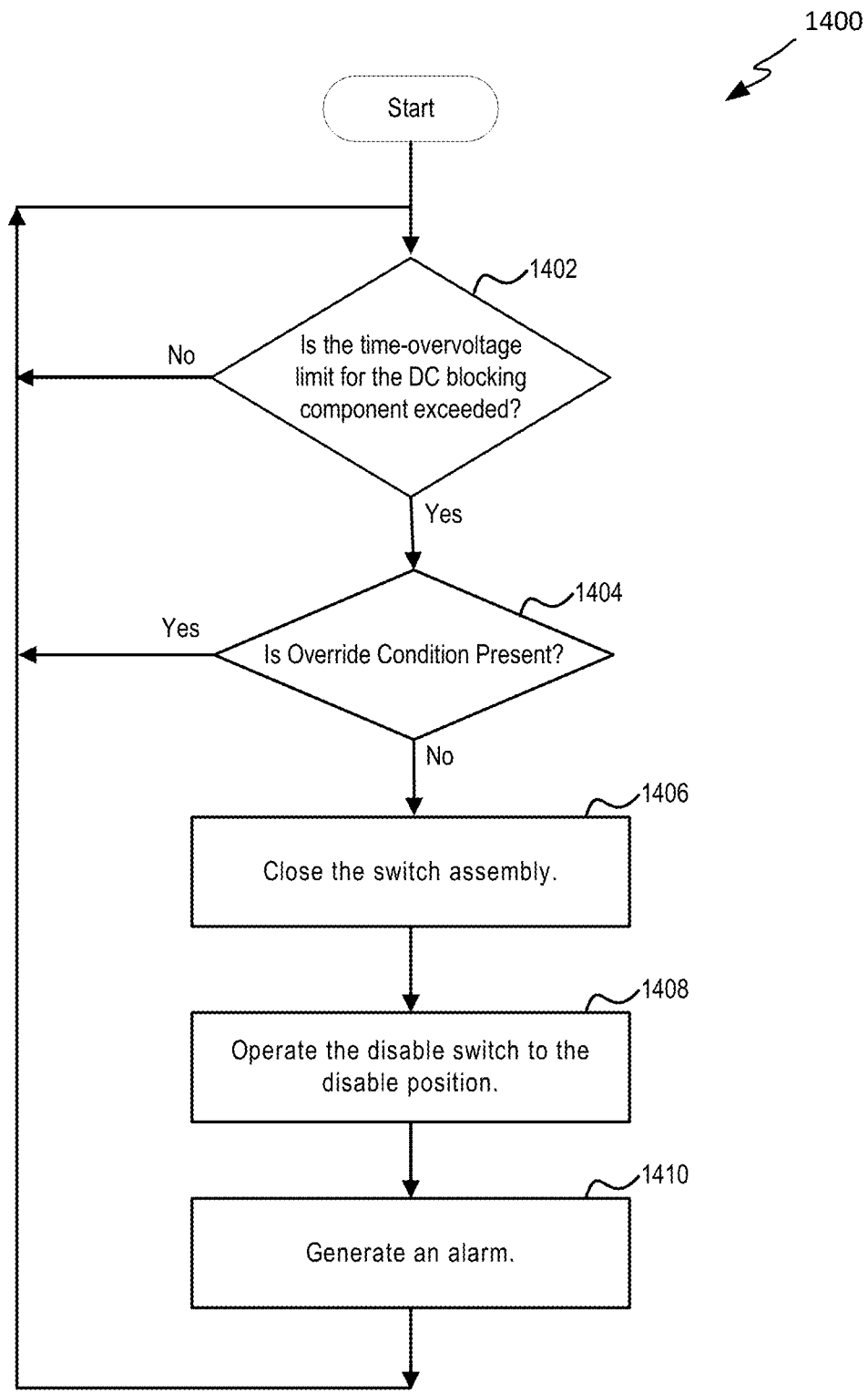
FIG. 14 illustrates an example process for protecting the DC current blocking component of FIGS. 2-4 from overvoltages, according to a possible embodiment of the present disclosure.

Referring now to FIG. 14, an example process 1400 performed by some embodiments of the control device 302 is illustrated. The process 1400 operates to protect subcomponents (e.g., the capacitor bank 214 and the resistor 212) of the DC current blocking component 210 as well as the transformer 110 from over-voltages.

In example embodiments, it is determined whether the time-overvoltage limits of the capacitor bank 214 or resistor 212 have been exceeded (step 1302). The time-overvoltage (TOV) is determined based on how long a corresponding device is at or above a voltage, i.e., either a direct current (DC) or alternating current (AC) voltage. TOV is tracked by calculating a total time at which the predetermined voltage level is met or exceeded. In some embodiments, the time-overvoltage limits of one or both of the capacitor bank 214 or resistor 212 are stored in the memory device 320 of the control module 304.

If a time-overvoltage limit is determined to be reached for the DC blocking component, it is determined whether an override condition is present (step 1404). If an override condition is present, the switch assembly still should not be closed despite the TOV determination, since it is preferable to cause possible damage to the DC current blocking component 210 as compared to allowing a hazard event to occur. As noted above, such hazard events can include, e.g., an EMP E3 event, a fast rise time/rate of change of GIC current, a high voltage at the transformer neutral that would result in a high current passing from the transformer neutral to ground if the switch assembly 202 were closed, thereby causing potential damage to the transformer. Accordingly, it is preferable to avoid damage to the transformer, when a choice may be made between the transformer and the DC current blocking component. Accordingly, rather than close the switch assembly to protect the DC blocking component, if a hazard event or other override condition is present, operational flow returns to step 1402 to simply continue monitoring, without further action until that override condition clears.

If it is determined that no override condition exists, a signal is sent to close the switch assembly 202 (step 1406). If not, the process repeats step 1402 to continuously monitor the electrical protection circuit 200.

In example implementations, the disable switch is operated to the disable position (step 1408). In some embodiments, the system 300 will not enter the GIC protective mode when the disable switch is set to disable. Beneficially, the disable switch can be used to disable the protective mode when measurements indicate that the components used in the protective mode are not operational or require maintenance. Of course, the disable switch should not be activated in the event of an override event, but since no override condition is present as in step 1404, it is acceptable, at this stage, to disable a blocking position of the switch assembly. In addition, an alarm is generated (step 1410). In some embodiments, a minor alarm is generated at step 1410. Additionally, in some embodiments, the event is logged as well. After completion of step 1410, the process 1400 returns to step 1402 so as to perform continuous monitoring of the electrical protection circuit 200.

Referring to FIGS. 10-14 generally, it is noted that in the event of an override condition, one or more additional steps may be performed to ensure protection of the transformer 110 due to EMP, fast rising GIC or high voltage events. For example, the transformer may, in some instances, be disconnected temporarily from the power grid, or the power grid may be sub-segmented to isolate portions of the grid and reduce potential DC current that is induced therein by essentially shortening the antennae (length of transmission lines in the circuit). Examples of such disconnection from the power grid in the event of hazard conditions are described in copending U.S. patent application Ser. No. 16/586,219, entitled "Power Grid Protection Via Transformer Neutral Blocking Systems and Triggered Phase Disconnection" filed on Sep. 27, 2019, the disclosure of which is hereby incorporated by reference in its entirety.

IV. Switch Assembly Opening Events (Blocking Mode Entry or Override Conditions)

While the arrangements of FIGS. 10-14 represent operational scenarios in which a switch assembly of the circuits of FIGS. 2-3 may be closed, it is noted that there are also circumstances in which the switch assembly should be opened. These scenarios may be performed in one or both of the operational modes described above (e.g., a normally closed or normally open default state).

As an initial matter, the switch assembly 202 of the electrical protection circuits of FIGS. 2-3 may open in the case of a detected DC current or quasi-DC current across the neutral or phase lines, DC voltage in the neutral (e.g. across the shunt resistor 206) or harmonics in at least one of the phase lines that is above a first threshold indicating that a damaging event would otherwise be allowed to flow to ground or destabilize the transformer 110. Examples of such voltages and harmonics issues are described in U.S. Pat. Nos. 8,878,396, 8,537,508, 9,077,172 and 9,564,753 the disclosures of which were previously incorporated by reference in their entireties.

Figure 15:
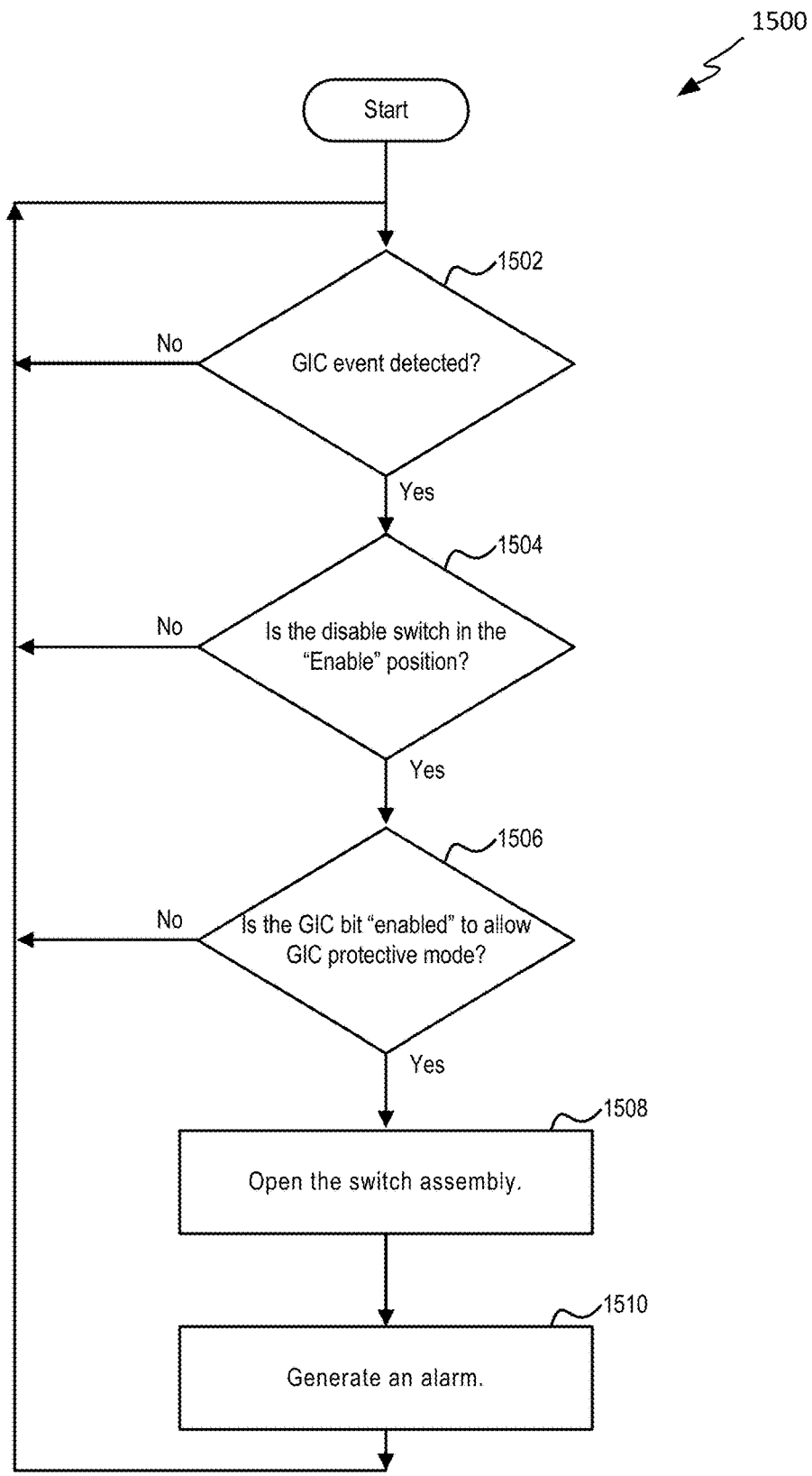
FIG. 15 illustrates an example process for detecting a GIC event and causing the electrical protection system of FIGS. 2-4 to operate in the GIC protective state, according to a possible embodiment of the present disclosure.

In particular, and referring to FIG. 15, an example process 1500 performed by some embodiments of the control device 302 is illustrated. The process 1500 operates to detect a DC current indicating a GIC or HEMP-E3 current and cause the electrical protection circuit 200 to operate in a GIC protective mode. In at least some embodiments, a GIC event is detected based on detecting a neutral DC current or DC voltage or quasi-DC or total harmonic distortion (THD) exceeding preset values, or by a measurement of the earth's magnetic field indicating a GIC event above a preset threshold, or a high electromagnetic field measurement indicating a HEMP-E1, E2 or E3 event. Such measurements may be taken, for example, from a substation that the transformer being protected is located in, (e.g., at potential transformers installed to provide a signal for a voltage THD). Such THD could be retrieved by a probe of the control device 302. Additionally, a trigger could come from a separate measurement device, such as a high field electromagnetic detector, to initiate protection for a HEMP-E1 event, or a magnetometer for a solar event. An example of such a detector is disclosed in U.S. Pat. Nos. 8,773,107 and 8,860,402 the disclosures of which was previously incorporated by reference in its entirety.

In example implementations, it is determined whether a GIC event is being detected (step 1502), for example based on comparing measurements captured by the GIC measurement device 306 at the shunt resistor 206, EMP detector, or potential transformers measuring THD on one or more phase lines to predetermined threshold values. In some embodiments, the range of predetermined threshold values of DC or quasi-DC current is 0.5-5 amps and the range of the predetermined threshold value for power harmonic levels are expected to be in the range of about 1% to 10% total harmonic distortion (THD). In some embodiments, if either the predetermined threshold value for DC or quasi-DC or the predetermined threshold value for harmonic levels is exceeded, it is determined that a GMD or EMP event is occurring.

If it is determined that a GMD or EMP event is occurring, the disable switch is checked to see whether the disable switch is the enable position (step 1504). If the disable switch is in the enable position, a GIC bit is checked to see whether the system 300 is allowed to enter GIC protective mode (step 1506). If the GIC bit is enabled, a signal is sent to open the switch assembly 202 thereby causing the DC current blocking component 210 to serve as the alternating current (AC) grounding path for the electrical protection circuit 200 and switching the system 300 to the GIC protective mode (step 1508). The DC current blocking component 210 blocks the DC or quasi-DC current generated by the GIC event and thereby protects the transformer 110 and associated grid components (e.g. High Voltage AC Breakers which are not designed for DC current). In some embodiments, the signal is sent by the switch control device 324 to open the DC switch 204, which in turn may cause the alternating current (AC) switch 208 to open as well. In some embodiments, the DC switch 204 is reclosed after 0.20 seconds and only the AC switch 208 remains open.

In example implementations, an alarm is generated (step 1510). In some embodiments, a minor alarm is generated at step 1510. Additionally, in at least some embodiments, the event is logged.

Alternatively, if it is not determined that a GMD event is detected at step 1502, the disable switch is not in the enable position at step 1504, or the GIC bit is not enabled at step 1506, the process returns to step 1502 to continuously monitor the electrical protection circuit 200. Similarly, after completion of step 1510, the process 1500 also returns to step 1502 so as to perform continuous monitoring of the electrical protection circuit 200.

It is noted that the operation of the process 1500 of FIG. 15 may be performed in conjunction with or in parallel with any determinations of the existence of an override event, as described above in FIG. 6. That is, an override event will not prevent the switch assembly from being opened, but may maintain the switch assembly in an open position after it is opened, despite the presence of any conditions as described above in conjunction with FIGS. 10-14.

Figure 16:
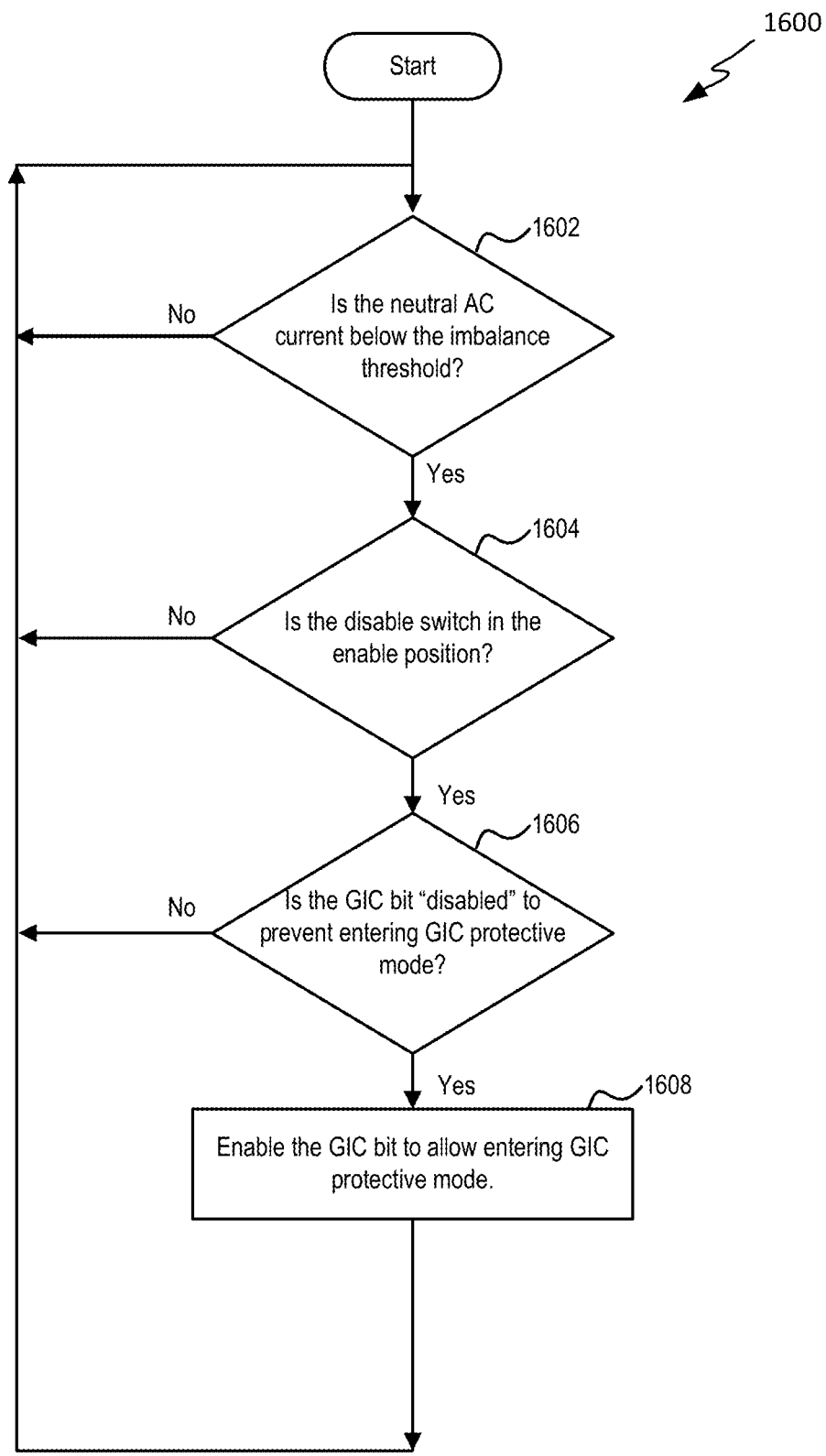
FIG. 16 illustrates an example process for ensuring imbalance alternating current (AC) in the transformer neutral is below levels that could damage the DC current blocking component of FIGS. 2-4, according to a possible embodiment of the present disclosure.

Referring now to FIG. 16, a further example process 1600 performed by some embodiments of the control device 302 is illustrated. This process 1600 may be performed, for example, to determine whether it is safe to open the switch assembly 202, for example to place the circuit in a GIC protective mode if operable in a default-closed configuration. The process 1600 operates to ensure the imbalance alternating current (AC) in the transformer neutral 111 is below levels that could damage the DC current blocking component 210.

In example embodiments, the control device determines whether the neutral alternating current (AC) as measured by the current transformer 308 is below a predetermined imbalance current threshold for a predetermined time period (step 1602). In some embodiments, the predetermined imbalance current threshold is 150 amps and the predetermined time period is 60 seconds. However, other embodiments use other thresholds.

If the neutral alternating current (AC) is below the imbalance current threshold, it is determined whether the disable switch is in the enable position (step 1604). If the disable switch is in the enable position, it is determined whether the GIC bit is currently disabled to prevent entering the GIC protective mode (step 1606). If the GIC bit is disabled, the GIC bit is enabled (step 1608) to allow the system 300 to enter the GIC protective mode, opening the switch assembly. In some embodiments, the event is logged as well.

Alternatively, if the current is determined to be above the imbalance threshold at step 1602, the disable switch is determined to be in the disabled position at step 1604, or the GIC bit is determined to not be disabled at step 1606, then the process 1600 returns to the step 1602 to continuously monitor the electrical protection circuit 200. Similarly, after completion of step 1608, the process 1600 also returns to step 1602 so as to perform continuous monitoring of the electrical protection circuit 200.

V. Switch Assembly Monitoring

In addition to the determinations above, additional tests may be performed to assess the loss of continuity between the transformer neutral and ground, or other malfunction of a transformer protection circuit. For example, a current detector, in the form of neutral current sensor 314 or current transformer (CT) 308, could sense the absence of AC current flowing at the transformer neutral. This may occur, for example, if perfect balance is achieved among the various phases of the multi-phase transformer 110 of FIGS. 2-4. However, it may also be the case that a connection between a transformer neutral 111 and a ground 113 has been lost (e.g., the switch assembly is stuck open and the DC current blocking component 210 or a component thereof such as a resistor or capacitor is damaged, or the maintenance bypass switch 220 was improperly operated).

Accordingly, it can be important to perform one or more additional tests to determine whether or not intervening action might be required.

Figure 17:
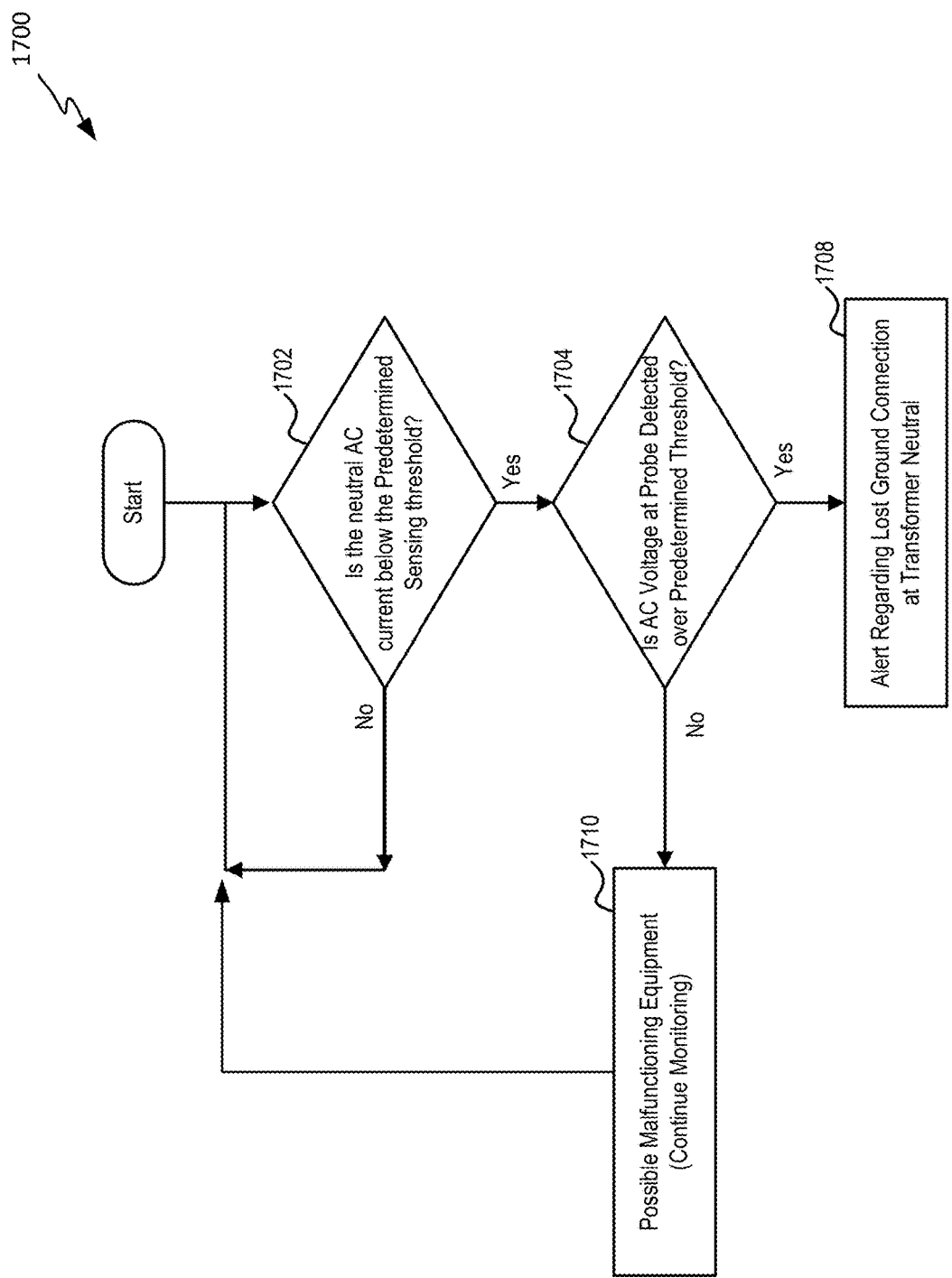
FIG. 17 illustrates an example process for detecting a loss of a ground connection at the transformer neutral of the electrical protection system of FIGS. 2-4.

As seen in FIG. 17, an example method 1700 of performing such a detection process is shown. The method 1700 may be performed, for example, using a computing system or controller operatively connected to a circuit such as the circuit seen in FIGS. 2-3. In the example shown, a determination is made as to whether a neutral AC current (an AC current at the transfer neutral) is below a predetermined sensing threshold at a current sensor that is configured to detect alternating current (step 1702). As noted above, the current sensor could be the neutral current sensor 314 (e.g. a Rogowski coil), but also could be current transformer 308 or some other current sensor. In example embodiments, the current sensor may be configured to detect a current in the milliamp range, and an example threshold may be below about 0.4 A. However other thresholds may be used.

If the neutral AC current is not below a predetermined sensing threshold, the method 1700 can include continuing to monitor the neutral AC current, with operation returning to step 1702. However, if the neutral AC current is below the predetermined sensing threshold, and alternating current voltage is assessed (step 1704). The alternating current voltage may be assessed, for example, at a voltage probe 316. The voltage at the voltage probe may be compared to a predetermined threshold of AC voltage that is expected to be seen at the voltage probe. For example, the voltage may be some portion of a voltage is expected to be seen at a transformer neutral within a power grid (e.g., greater than or equal to 10V+ or more, and in some instances above 1 kV). If the AC voltage is not above the predetermined threshold, it can be concluded that the transformer neutral has not lost connection, but instead some other malfunction may have occurred. For example, the neutral current sensor 314, which may be implemented as a Rogowski Coil, may have failed, and should be replaced. Accordingly, in such instances a possible malfunction may be determined (step 1710), and monitoring of the circuit may be allowed to continue. However, if the AC voltage at the voltage probe is over a predetermined threshold, an alert may be generated indicating a lost ground connection at the transformer neutral (step 1708).

Figure 18:
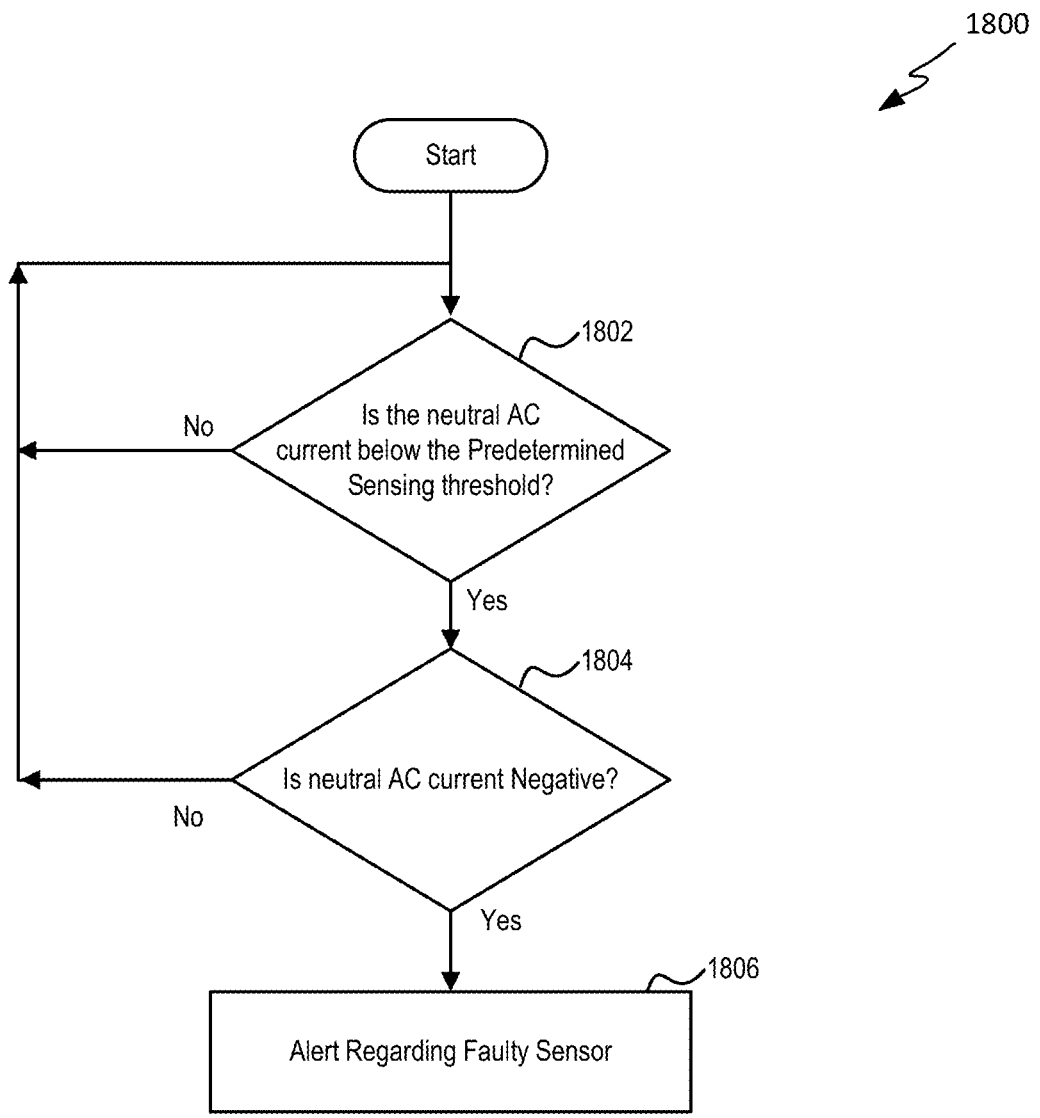
FIG. 18 illustrates an example process for detecting a faulty ground connection monitor of the electrical protection system of FIGS. 2-4.

In some instances, rather than malfunction of the circuit itself, a malfunction of one or more sensors may occur. As seen in FIG. 18, an example method 1800 of performing a detection process is shown in which assessment of a current sensor is provided.

In the example shown, an assessment may be performed to determine whether a neutral AC current is below a predetermined AC threshold at the transformer neutral (step 1802). The threshold can be set, for example, at an AC current level below that which would be expected at the transformer during normal operation. If the current is not below the threshold, monitoring may continue. However, if the current is below the threshold, a further assessment may be performed to determine if the neutral AC current reads as a negative value (step 1804). If the current is not negative, it is feasible that the transformer is disconnected or that the neutral AC current is otherwise plausible; accordingly, monitoring may continue. However, if the current is negative, it may be determined that there is an error with a current sensor or other sensor at the circuit 200; in this instance, an alert is generated (step 1806) indicating a faulty sensor. The alert may be displayed locally or communicated from a local controller to a remote system to indicate a need for system maintenance to a grid operator.

VI. Lockout and Automatic/Manual Modes of Operation

Referring now to FIGS. 19-23, additional processes for operating a transformer protection system are described. The specific processes of FIGS. 19-23 describe use of specific automatic triggering of phase breakers, such as breakers 402 seen in FIG. 4, in response to certain conditions, for example, during detection of particular events that might result in DC voltages that are above at least an initial threshold (e.g., above Threshold 1, seen in FIG. 7, above).

Figure 19:
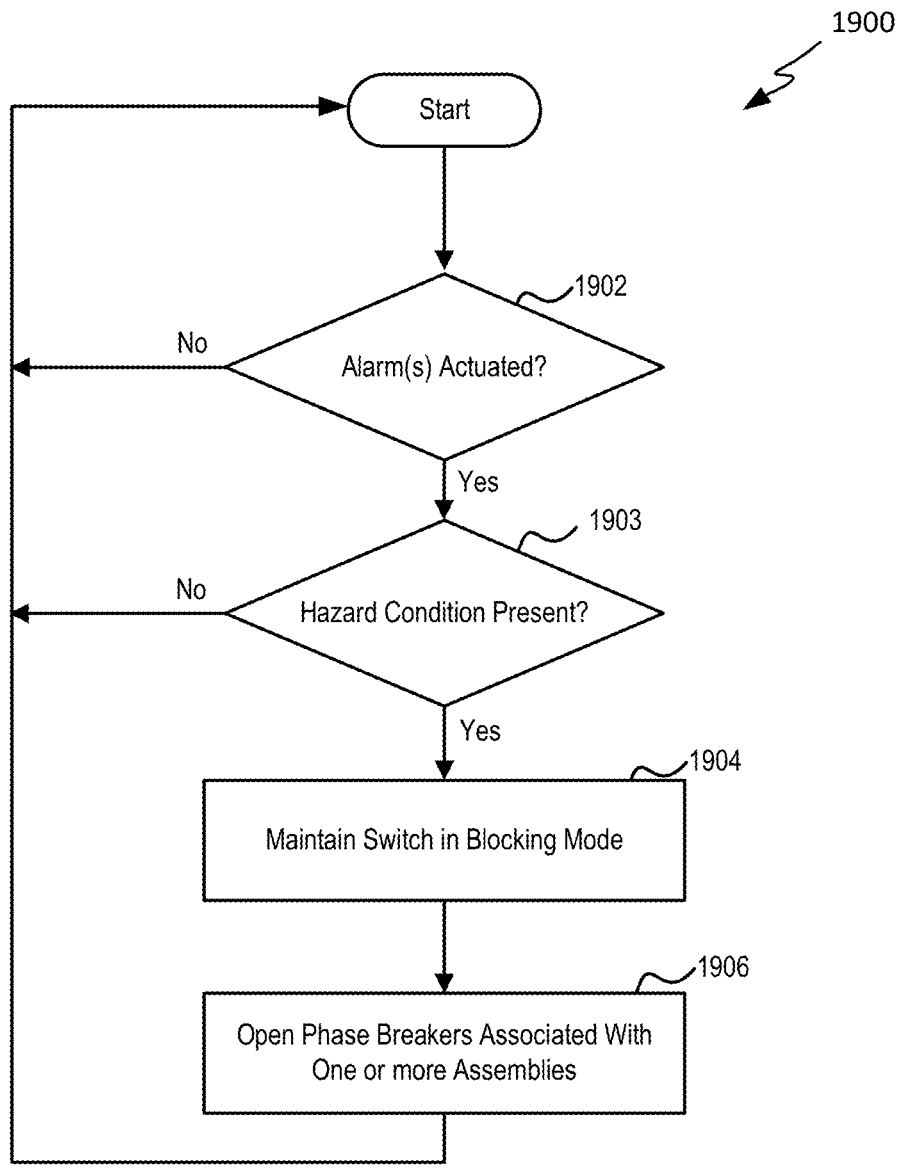
FIG. 19 illustrates an example process for operating a transformer protection system during predefined alarm conditions.

In a first example, FIG. 19 illustrates a process 1900 for operating a transformer protection system during a set of predefined alarm conditions. In general, the process 1900 is operable with a transformer protection circuit that is used in a normally open state, and which would otherwise operate to close in the event of relatively low DC voltage (e.g. below Threshold 1 of FIG. 7). In the example shown, the process 1900 includes determining, at operation 1902, whether one or more alarms have been activated based on a triggering event. The alarms can include, for example, determining an AC imbalance, and AC time overvoltage, a loss neutral, triggering of an overvoltage protection device, or any other of the operations previously described. In such instances, if an alarm is detected, the presence of a hazard condition may be assessed, at operation 1903. A hazard condition may include, for example, a direct current voltage at the transformer neutral exceeding a second predetermined threshold, an electromagnetic pulse event, or a geomagnetically induced current having a rise time of less than 25 seconds, or in some instances less than about 0.1 seconds. Other hazard events may be possible as well.

If an alarm is detected and a hazard condition is also detected, it may be inadvisable to close the switch assembly. Accordingly, the switch is maintained in a blocking mode (switch assembly 202 is open), at operation 1904. Still further, phase breakers are opened associated with one or more transformer assemblies at operation 1906. The phase breakers may be, for example, phase breakers adjacent to a transformer at which such electrical conditions are detected, or may be remote from such a transformer.

Figure 20:
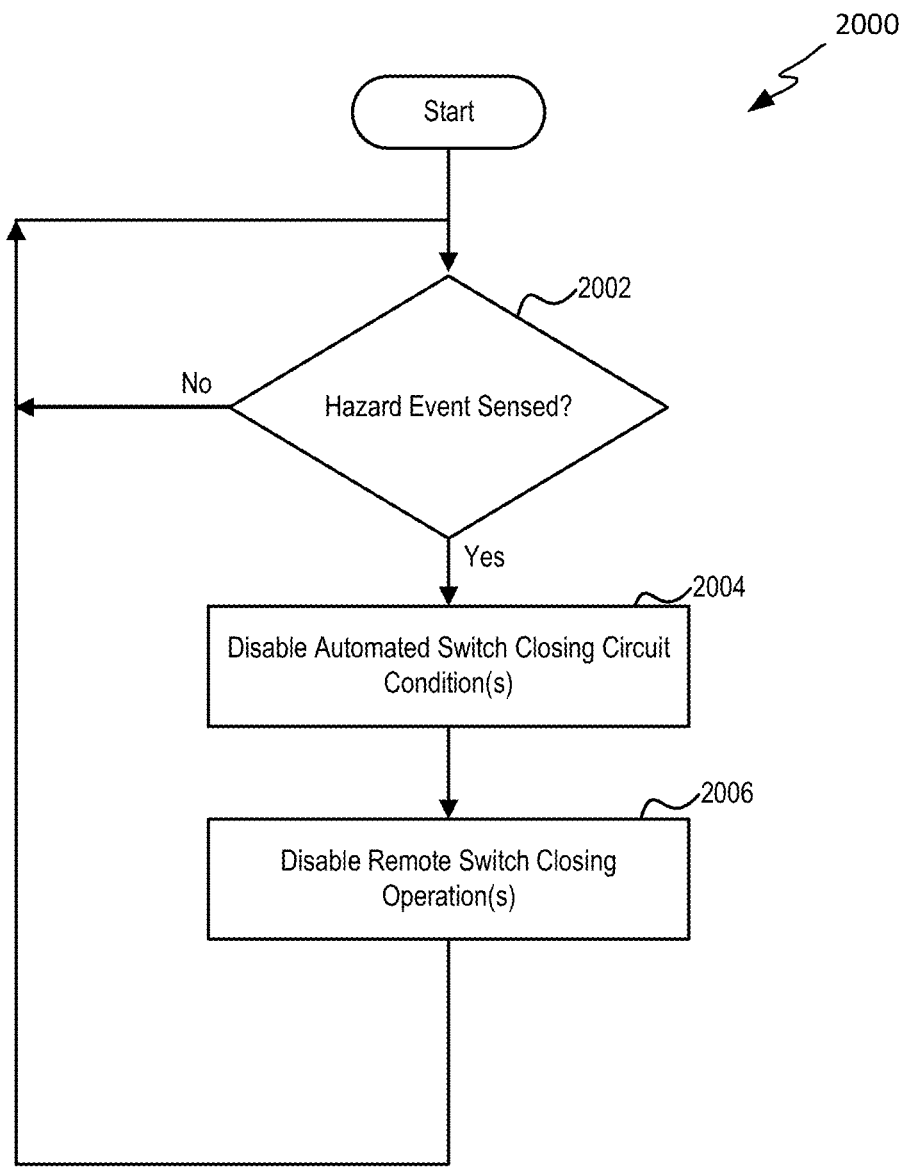
FIG. 20 illustrates an example process for operating a transformer protection system that provides a "lockout" mode of operation.

FIG. 20 illustrates an example process 2000 for operating a transformer protection system during a hazard event that provides a "lockout" mode of operation. Such a process may be used, for example, during a solar storm or EMP event to protect against the possibility of receiving a command to close a switch assembly, and therefore destroy the transformer protected by a transformer protection circuit such as described above.

In the example shown, the process 2000 includes determining whether a hazard event is sensed (step 2002). A hazard event may include, for example, a solar storm (in particular, a larger storm that, while blocking, induces high DC voltages) or an EMP event (in particular an E1 portion of an EMP event, in some cases). A hazard event may also correspond to, e.g., a fast rise time (e.g., less than 25 seconds, or in some instances as little as 0.1 seconds or less) of geomagnetically induced current, or other event that may cause damage or induce high DC voltage at the transformer neutral. If no such hazard event is occurring, monitoring may simply continue. However, if a hazard event is occurring, conditions that would otherwise lead to automated switching of a switch assembly to a closed position may be disabled (step 2004). Additionally, remote switch closing operations are disabled (step 2006). In some examples, one or both of step 2004, 2006 may be implemented without the other of the operations. However, for safety purposes, it may be advisable to disable both automated switching and remote switching, to ensure that any switch closing operations are performed purposefully, and locally at the transformer protection circuit.

Referring to FIG. 20 generally, the disabling of automated switching and or remote switching to a closed position ensures that remote hackers cannot force transformer protection equipment into a state where damage may potentially occur. Rather, remote operators may only allow for opening of switch assemblies, such as phase breakers, to separate the transformer from other portions of a power grid, thereby only allowing enhancement of protection, rather than exposure to potential damage.

Figure 21:
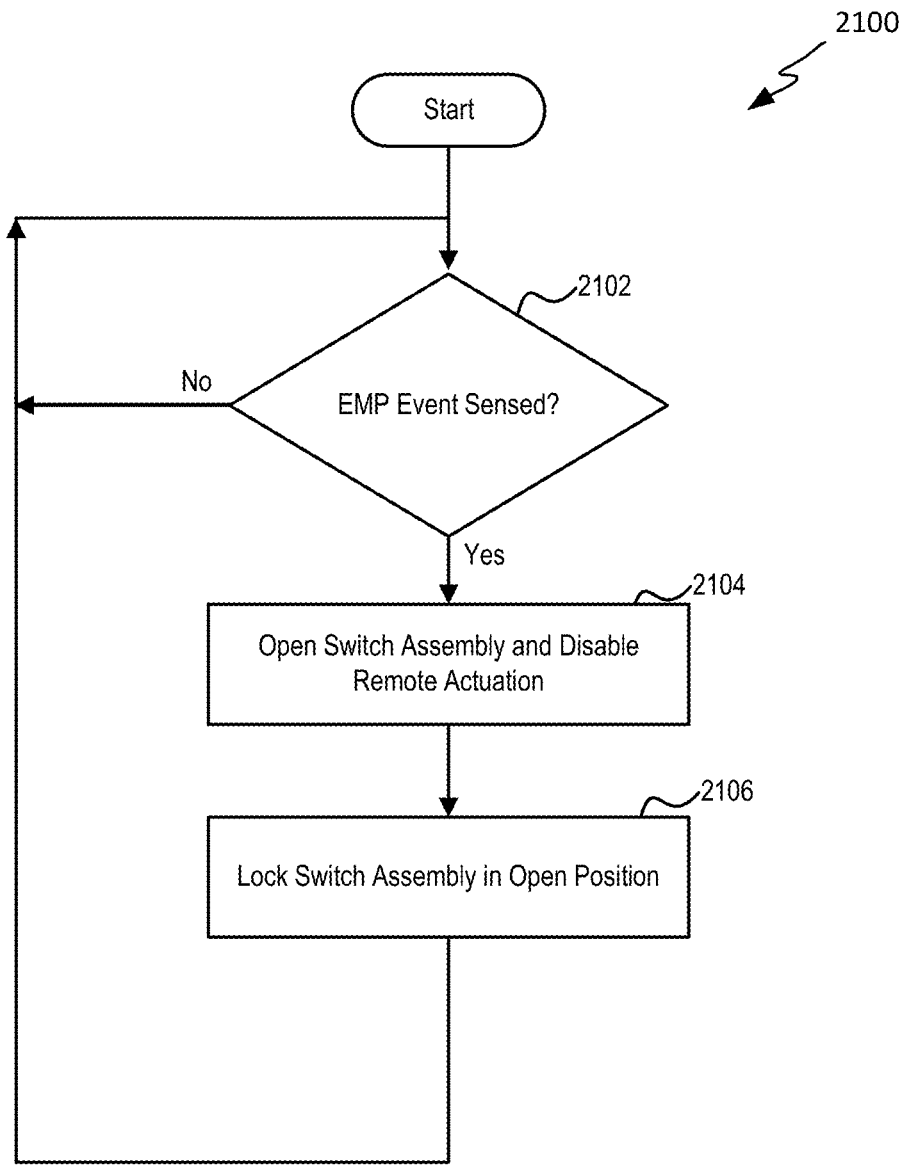
FIG. 21 illustrates an example process for operating a transformer protection system during an electromagnetic pulse (EMP) event that provides a "lockout" mode of operation; FIGURE

FIG. 21 illustrates an example process 2100 for operating a transformer protection system during an electromagnetic pulse (EMP) event that provides a "lockout" mode of operation. The process 2100 detects the presence of an EMP event, and removes remote control capability, thereby avoiding the possibility of the EMP event interfering with data received at a local controller, thereby scrambling or misprogramming the local system.

In the process 2100 as shown, an EMP event may be sensed (step 2102). If an EMP event is sensed, the switch assembly included in a circuit (e.g. the circuits described above) may be opened. Additionally, remote actuation is disabled. Because an EMP event will typically include the E1 phase, it is possible the SCADA signals will be scrambled sending unintended commands or that a voltage probe or some other sensor included within transformer protection circuitry may be destroyed, thereby making it difficult to determine what is happening at the transformer protection circuit, and therefore on the power grid. Accordingly, the safest operation of the transformer protection circuit is to maintain the switch assembly in an open position. The switch assembly may be opened and any remote actuation disabled (step 2104). Accordingly, the switch assembly may also be "locked" in an open position such that an alarm, SCADA operators, hackers, or even an all clear signal from a voltage probe cannot re-close the switch assembly (step 2106). For example, the E1 phase of an EMP event could for example blow a fuse that would open the switch assembly and achieve this "Lockout" feature.

Figure 22:
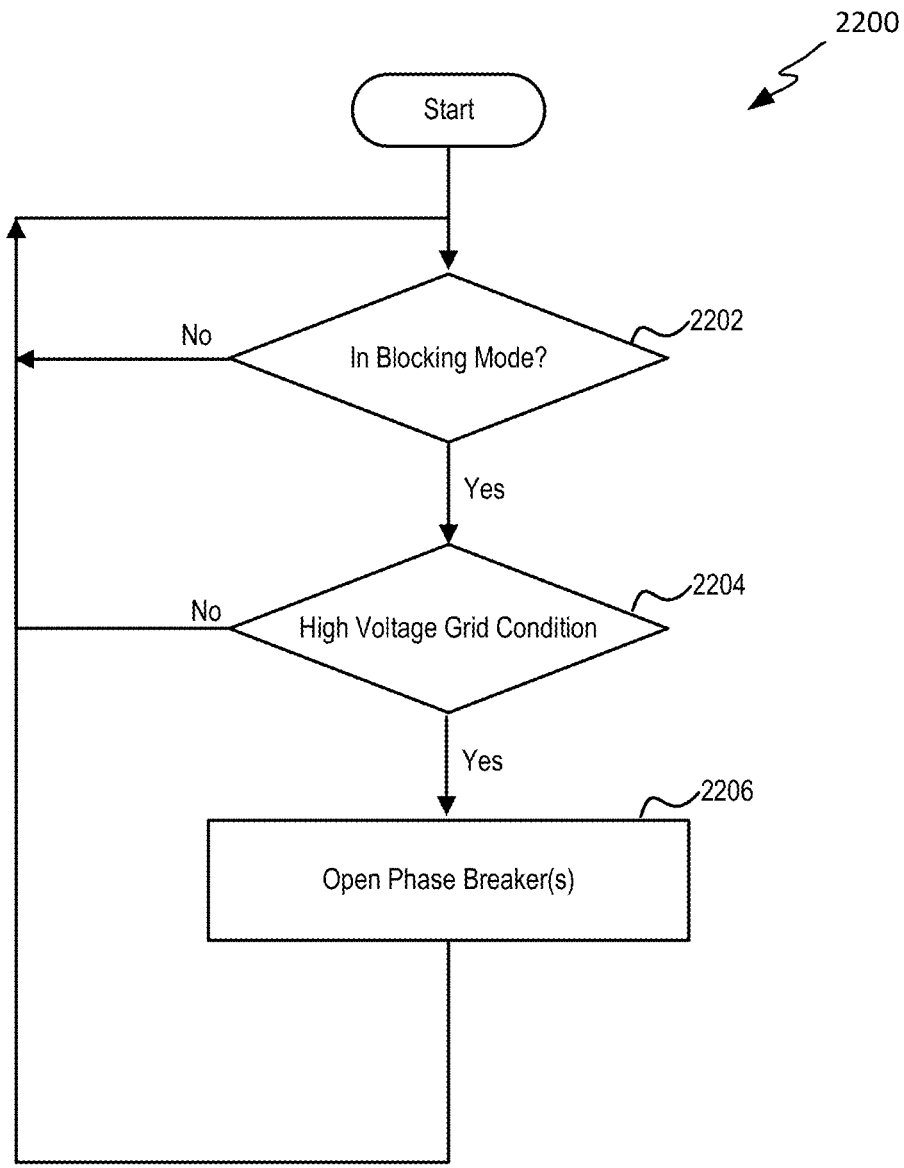
FIG. 22 illustrates an example process for operating a transformer protection system in the event of a high voltage condition while the transformer protection circuit is in a blocking mode.

FIG. 22 illustrates a further example process 2200 for operating a transformer protection system in the event of a high voltage condition while the transformer protection circuit is in a blocking mode. In this example, the process 2200 may be used to prevent a high DC current from flowing from a transformer neutral to ground by preemptively opening phase breakers, such as breakers 402 described above. In particular, the process 2200 includes determining that the transformer protection circuit is in a blocking mode (step 2202). If in a blocking mode, an assessment is performed to determine whether a high-voltage grid condition exists (step 2204). If such a high voltage grid condition exists, phase breakers are opened, preferably before the switch assembly 202 closes (e.g. to relieve the capacitors 214) and the high DC voltage becomes high DC current (step 2206). This ensures that, if for some reason the switch assembly were to close, a significant current will not pass from the transformer neutral to ground, because the transformer phases will be disconnected from the power grid. This avoids significant potential damage to the phase breakers by preemptively opening those breakers with no DC current across them, and also prevents or mitigates the possibility of damage to the transformer itself.

Figure 23:
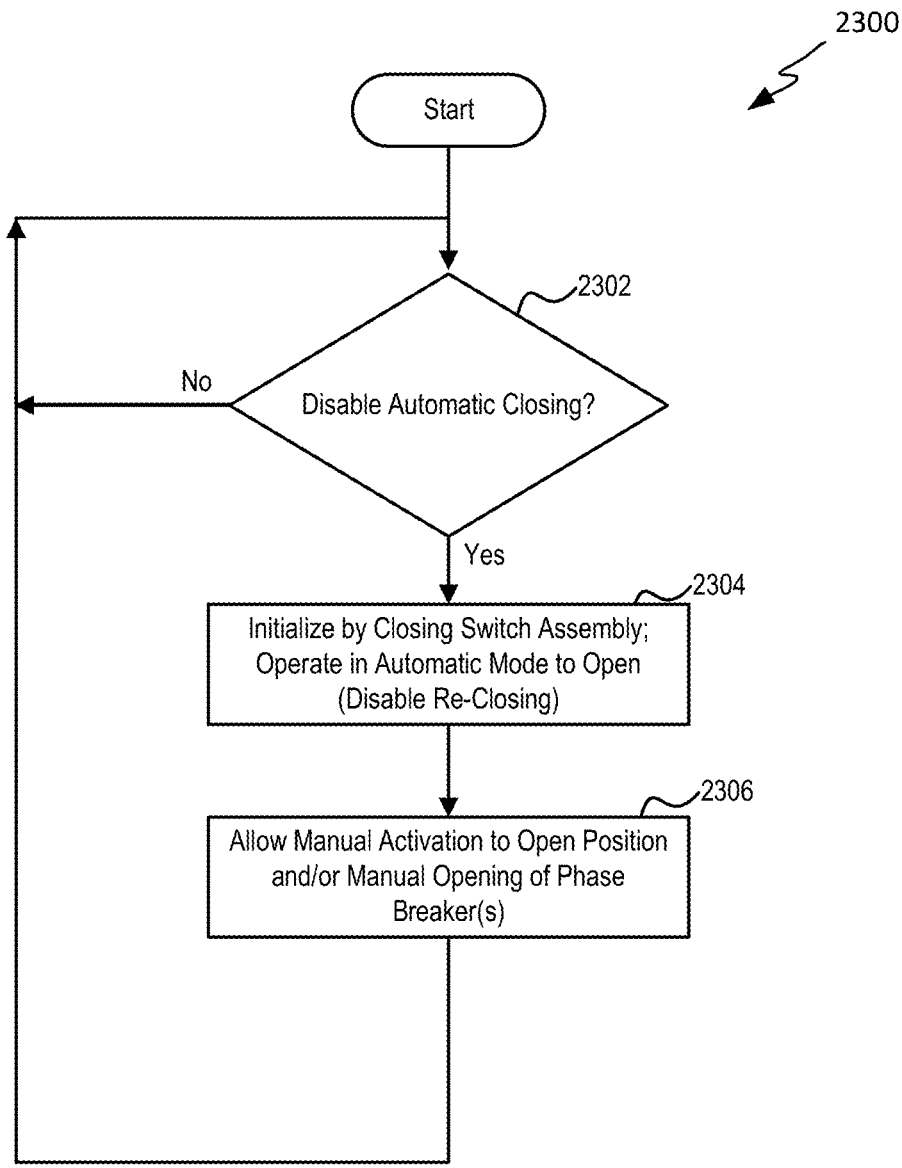
FIG. 23 illustrates an example configurable operation mode of a transformer protection system.

FIG. 23 illustrates an example process 2300 illustrating a configurable operation mode of a transformer protection system. In particular, the process 2300 may be used in the instance that automatically closing a switch assembly of a protection circuit is not desired, but automatic opening in the event of a potentially dangerous condition is still allowed. Accordingly, the switch assembly is operable in and only partially manual mode, with automatic opening still supported.

In the example shown, it may be determined, for example by a control system 300, 400 that automatic closing should be disabled (step 2302). If so, the transformer protection circuit may be initialized by closing a switch assembly, and allowing the switch assembly to operate in an automatic mode to automatically open the switch assembly when a potentially dangerous event is detected (step 2304). However, re-closing the switch assembly is disabled in this circumstance, as noted above. Accordingly, manual activation of the switch assembly to an open position is allowed, as well as manual opening of phase breakers, such as phase breakers 402 seen in FIG. 4 (step 2306). However, automatic closing of the switch assembly or breakers may be deactivated in this case.

The manual opening of a switch assembly may be used, for example, in the instance that a solar storm event is forecast. If something in particular goes wrong, phase breakers may also be opened.

VII. Software Architecture

Figure 24:
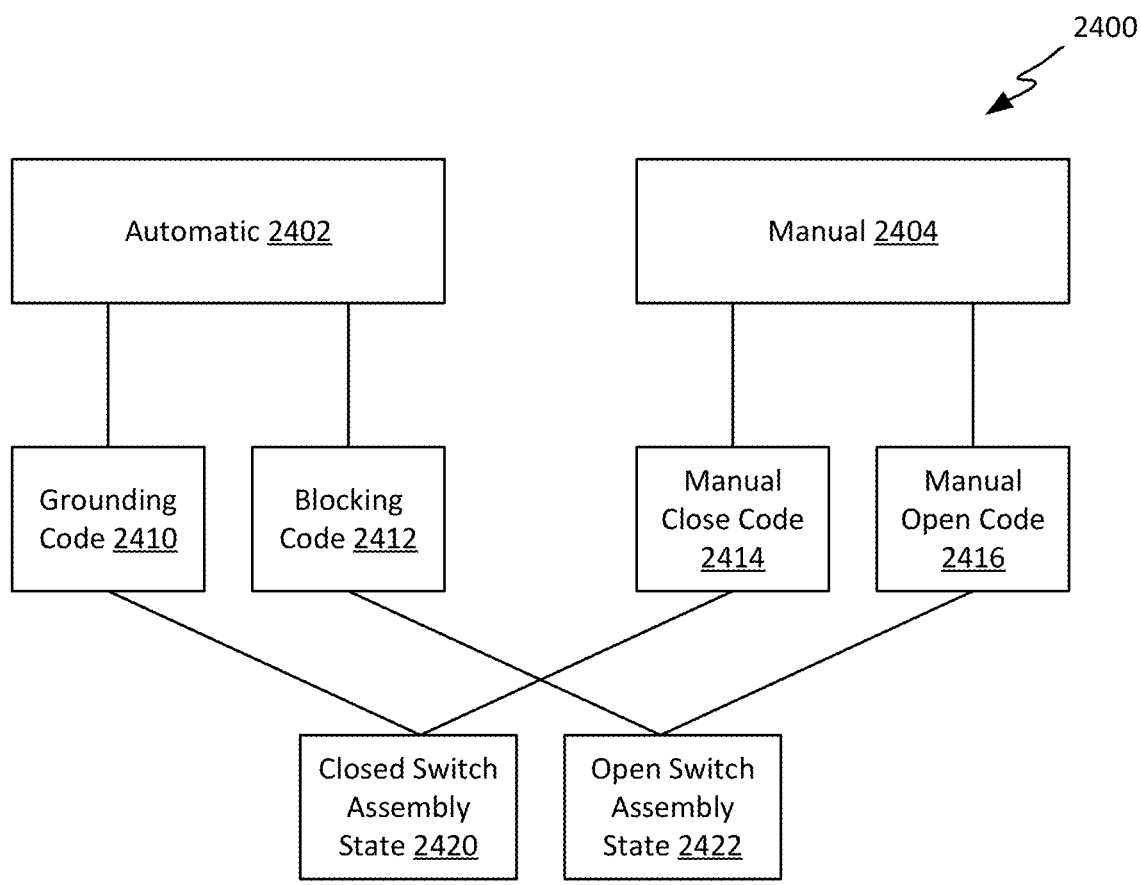
FIG. 24 is an example block diagram of a modular software system implemented in a control circuit described herein for implementing aspects of the present disclosure.

Referring to FIG. 24, an example logical software architecture is shown for implementing the test mechanisms described above. The logical software architecture 2400 may be implemented as a series of functions or modules stored in a memory of a controller or control circuit for execution via a microprocessor, as may be included in the systems described above in conjunction with FIGS. 1-4.

In the example shown, the software architecture 2300 includes an automatic operation module 2302 and a manual operation module 2304. The automatic operation module 2302 may be executable when a control circuit is designed for automated operation of a switch assembly 202, while the manual operation module 2304 may be used when only manual actuation of the switch assembly 202 is desired.

In the example shown, the automatic operation module 2402 may call a grounding code module 2410 or a blocking code module 2412. The grounding code module 2410 may cause the switch assembly to close based on assessment of one or more conditions that may be assessed as part of the grounding code module 2410 or as part of the automatic operation module 2402. Example conditions to be assessed are described above. Additionally, while in the grounding code module 2410, conditions on the grid may temporarily trigger the blocking code module 2412, i.e., an open switch assembly state, and then return to the grounding code module 2410, i.e., a closed switch assembly state.

The blocking code module 2412 may cause the switch assembly to open based on assessment of conditions as part of the blocking code module 2412 or as part of the automatic operation module 2402. Example conditions may include, for example, those described above in conjunction with FIGS. 19-22. Additionally, while in the blocking code module 2412, conditions on the grid may temporarily trigger the grounding code module 2410, i.e., a closed switch assembly state, and then return to the blocking code module 2412, i.e., an open switch assembly state.

The manual operation module 2404 executes in response to specific user commands only, rather than assessing circuit conditions. Indeed, the manual operation module 2404 may be configured to ignore circuit conditions that may otherwise cause the automatic operation module 2402 to open or close the switch assembly 202. Manual operation module 2404, when selected, effectively locks the switch assembly 202 in whatever state it is in when the manual operation module 2404 is selected. In order to change the state of the switch assembly, another module must be selected. In the example shown, the manual operation module 2404 may call a manual close module 2414 or a manual open module 2416. The manual close module 2414 may operate to close an open switch assembly (e.g., a default-open switch assembly, or a switch assembly that was otherwise triggered open) and the manual open module may operate to open a closed switch assembly (similarly, a default-closed switch assembly, or a switch assembly that was otherwise triggered closed). Upon execution of the grounding code 2410 or the manual close module 2414, a closed switch assembly state 2420 is entered, indicating connection between the transformer neutral and ground. Upon execution of the blocking code module 2412 or the manual open module 2416, an open switch assembly state 2422 is entered, indicating the solid metallic path is open, leaving the transformer AC grounded through the DC blocking path to ground.

VIII. Advantages and Operational Effects

Referring to FIGS. 1-24 generally, it is noted that the remote switching security and flexibility provided by adjustment of modes from a remote control and coordination system 150 allows utilities to manage, either individually or collectively, operation of the protection circuits within that utility power grid, while ensuring both (1) security, by avoiding direct and immediate access to the condition of a switch, and (2) maintaining local switch control by the controller 114, 302 to provide quick automatic reaction to local conditions (e.g., EMP events that have no warning and do not leave time for operator remote reaction). Additionally, by setting various override conditions, in some instances, damage to circuit and power grid components may be avoided for cases in which large voltages or currents would otherwise be experienced at the transformer neutral. Other advantages are apparent as well from the above description and following claims.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of particular protection circuits, other specific protection circuits may be useable with the concepts described herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A control circuit communicatively connected to a transformer protection circuit including a direct current blocking component electrically connected between a transformer neutral and a ground and a switch assembly electrically connected in parallel to the direct current blocking component, the control circuit comprising:
    a programmable circuit configured to execute instructions which cause the control circuit to adjust a default setting for operation of the transformer protection circuit between a first mode and a second mode;
    wherein, in the first mode, a switch assembly of the transformer protection circuit operates in a normally-closed state and the programmable circuit automatically opens the switch assembly to remove a bypass path from between the transformer neutral and the ground based on detection of a triggering event, the bypass path bypassing the direct current blocking component, the triggering event being at least one of:
        a direct current or quasi-direct current between the transformer neutral and the ground;
        a direct current or quasi-direct current in at least one phase of the transformer;
        a direct current voltage at the transformer neutral;
        a harmonic signal in at least one phase of the transformer; or
        an electromagnetic event detected in a vicinity of the transformer; and
    wherein, in the second mode, the switch assembly operates in a normally-open state and the programmable circuit automatically closes the switch assembly to form the bypass path between the transformer neutral and the ground based on detection of a second triggering event, the second triggering event being at least one of:
        an alternating current at the transformer neutral above a predetermined AC threshold;
        an alternating current between the transformer neutral and the ground exceeding a second predetermined AC threshold over a predetermined amount of time;
        a voltage at the transformer neutral above a predetermined threshold;
        a time-overvoltage at the transformer neutral exceeding a second predetermined threshold; or
        actuation of an overvoltage protection device positioned in parallel with the direct current blocking component between the transformer neutral and the ground.

2. The control circuit of claim 1, wherein the electromagnetic event has a magnitude indicative of potential damage to at least one of (1) the transformer, (2) the transformer protection circuit, or (3) the control circuit.

3. The control circuit of claim 1, wherein the programmable circuit is communicatively connected to a controller of the transformer protection circuit, and is located remotely from the controller and the transformer protection circuit.

4. The control circuit of claim 3, wherein the programmable circuit is included within a remote control and coordination system that is communicatively connected to a plurality of controllers, each of the plurality of controllers being included in different transformer protection circuits that are installed at different transformers within a power grid.

5. The control circuit of claim 3, wherein the programmable circuit is configured to execute instructions to communicate to the controller to enter a bypass mode, wherein, in the bypass mode, the controller maintains the switch assembly in a closed position to maintain the bypass path irrespective of occurrence of the triggering event.

6. The control circuit of claim 3, wherein the programmable circuit is configured to execute instructions to communicate to the controller to maintain the switch assembly in the open position irrespective of occurrence of the second triggering event.

7. The control circuit of claim 3, wherein the programmable circuit is further configured to transmit a command to the controller to adjust a threshold within a pre-set range of acceptable threshold values.

8. The control circuit of claim 7, wherein the threshold comprises at least one of:
the predetermined AC threshold;
the second predetermined AC threshold;
the predetermined DC threshold;
the predetermined quasi-dc threshold;
the harmonic threshold;
the voltage threshold; or
one or more time thresholds,
wherein a value included within the command is maintained within a pre-set range of acceptable threshold values.

9. The control circuit of claim 1, wherein, after adjusting the default setting, the programmable circuit prevents a second adjustment of the default setting for at least a predetermined amount of time.

10. The control circuit of claim 1, wherein, in both the first mode and the second mode, the switch assembly is maintained in an open position to remove the bypass path upon detection of the direct current voltage at the transformer neutral that is above a second predetermined DC voltage threshold.

11. The control circuit of claim 1, wherein the induced current at the transformer neutral is based, at least in part, on a current induced on power lines of a power grid to which the transformer is connected.

12. The control circuit of claim 1, wherein the programmable circuit is incapable of triggering the switch assembly to close to form the bypass path when a direct current voltage above a second predetermined DC voltage threshold is detected at the transformer neutral.

13. The control circuit of claim 10, wherein, upon a DC voltage reaching the second predetermined DC voltage threshold, the programmable circuit is further configured to, in response to an alarm or to the second triggering event, send a signal to open one or more phase breakers electrically connected to the transformer.

14. The control circuit of claim 1, wherein the programmable circuit is further configured to:
monitor an alternating current at the transformer neutral to determine whether the alternating current falls below a predetermined sensing threshold;
upon detecting that the alternating current has fallen below the predetermined sensing threshold, determine whether an alternating current voltage at a voltage probe exceeds a second predetermined threshold; and
based on a determination that the alternating current voltage exceeds the second predetermined threshold, generate an alert indicating a lost connection between the transformer neutral and the ground.

15. The control circuit of claim 1, wherein the programmable circuit is further configured to:
monitor an alternating current at the transformer neutral to determine whether the alternating current falls below a predetermined sensing threshold;
upon detecting that the alternating current has fallen below the predetermined sensing threshold, determine whether the alternating current is negative;
based on a determination that the alternating current is negative, generate an alert indicating the sensor is broken.

16. A control circuit communicatively connected to a transformer protection circuit including a direct current blocking component electrically connected between a transformer neutral and a ground and a switch assembly electrically connected in parallel to the direct current blocking component, the control circuit comprising:
a programmable circuit configured to execute instructions to:
detect a triggering event at the transformer neutral;
based on the triggering event occurring, determine whether to automatically actuate the switch assembly to close to form a bypass path between the transformer neutral and the ground;
based on a hazard condition being present when the triggering event is detected, override the determination of whether to actuate the switch assembly, thereby maintaining the switch assembly in an open position;
wherein the triggering event comprises at least one of:
a voltage at the transformer neutral above a predetermined threshold;
a time-overvoltage at the transformer neutral exceeding a second predetermined threshold;
actuation of an overvoltage protection device positioned in parallel with the direct current blocking component between the transformer neutral and the ground;
an alternating current between the transformer neutral and the ground above a predetermined AC threshold; or
an alternating current at the transformer neutral exceeding a second predetermined AC threshold over a predetermined amount of time;
wherein the hazard condition comprises at least one of:
a direct current (DC) voltage at the transformer neutral exceeding a predetermined DC voltage threshold;
an electromagnetic pulse event; or
a geomagnetically induced current having a rise time of less than 25 seconds.

17. The control circuit of claim 16, wherein the programmable circuit is directly connected to the transformer protection circuit and is local to the transformer protection circuit.

18. The control circuit of claim 16, further comprising a voltage sensor electrically coupled at the transformer neutral, the voltage sensor providing a signal indicative of voltage at the transformer neutral to the programmable circuit.

19. The control circuit of claim 16, further comprising a current sensor electrically connected to the programmable circuit, the current sensor being used to determine at least one type of the predetermined alternating current condition.

20. The control circuit of claim 16, wherein the predetermined DC voltage threshold is below 1000 volts DC.

21. The control circuit of claim 16, wherein the predetermined DC voltage threshold corresponds to a DC current representing a potential thermal damage limit of the transformer.

22. The control circuit of claim 16, wherein the programmable circuit is remotely located from the transformer protection circuit and receives the direct current voltage from a controller local to the transformer protection circuit.

23. The control circuit of claim 16, wherein, in the presence of a hazard condition and a triggering event, the control circuit is further configured to send an actuation signal to circuit breakers electrically connected to power line phases of a transformer that includes the transformer neutral.

24. The control circuit of claim 16, wherein, in the presence of a hazard condition and a triggering event, the control circuit is further configured to send an alarm.

25. The control circuit of claim 16, wherein the control circuit is further programmed to:
receive, at the control circuit, a command to close the switch assembly to form a bypass path; and
based on the presence of a hazard condition, disregard the command and maintaining the switch assembly in an open position.

26. The control circuit of claim 25, wherein the control circuit is further programmed to actuate circuit breakers electrically connected to phase lines of the transformer to disconnect the transformer from at least a portion of the power grid.

27. A method of operating a transformer protection circuit, the method comprising:
monitoring a voltage at a transformer neutral of a transformer positioned within the power grid, the transformer neutral being electrically connected to a direct current blocking component that electrically connects the transformer neutral to a ground;
based on a direct current voltage at the transformer neutral being below a predetermined threshold, determining whether an electrical condition exists to actuate a switch assembly to close to form a bypass path between the transformer neutral and the ground, the switch assembly being operable in a first mode or a second mode; and
based on the direct current voltage at the transformer neutral being above the predetermined threshold, overriding the determination of whether to actuate the switch assembly, thereby maintaining the switch assembly in an open position and eliminating the bypass path regardless of whether the switch assembly is operating in the first mode or the second mode;
wherein, in the first mode, the switch assembly operates in a normally-closed state and opens to remove a bypass path from between the transformer neutral and the ground based on detection of a triggering event, the bypass path bypassing the direct current blocking component; and
wherein, in the second mode, the switch assembly operates in a normally-open state and closes to form the bypass path between the transformer neutral and the ground based on detection of a second triggering event.

28. The method of claim 27, further comprising actuating circuit breakers electrically connected to phase lines of the transformer to disconnect the transformer from at least a portion of the power grid.

29. The method of claim 27, further comprising:
counting a number of overvoltage events at an overvoltage device electrically connected in parallel with the direct current blocking component; and
based on the number of overvoltage events exceeding a predetermined threshold, actuating the switch assembly to establish the bypass path between the transformer neutral and the ground.

30. The method of claim 27, further comprising:
receiving, at a controller that is electrically connected to the switch assembly, a command to close the switch assembly to form the bypass path; and
based on a direct current voltage at the transformer neutral being above a predetermined threshold, not actuating the switch assembly to form the bypass path.

31. The method of claim 27, further comprising:
receiving an indication of a forecast solar storm event; and
in response to the indication, opening the switch assembly and deactivating automatic closure of the switch assembly.

32. A control circuit communicatively connected to a transformer protection circuit including a direct current blocking component electrically connected between a transformer neutral and a ground and a switch assembly electrically connected in parallel to the direct current blocking component, the control circuit comprising:
a programmable circuit;
a memory storing instructions executable by the programmable circuit, the instructions causing the control circuit to perform a method comprising:
initiating operation of the control circuit in a selected mode, the selected mode being operator-selectable from between an automatic mode and a manual mode;
in the automatic mode:
operating to automatically actuate the switch assembly from an open position to a closed position in response to one or more grounding conditions using grounding code to establish a solid metallic path from a transformer neutral to ground;
operating to automatically actuate the switch assembly from the closed position to the open position in response to one or more blocking conditions using blocking code to disconnect the solid metallic path between the transformer neutral and ground;
in the manual mode:
operating to maintain the switch assembly in a closed position using manual closed code, thereby maintaining the solid metallic path between the transformer neutral and the ground regardless of presence of the one or more blocking conditions; and
operating to maintain the switch assembly in an open position using manual open code, thereby maintaining disconnection of the solid metallic path between the transformer neutral and the ground regardless of presence of the one or more grounding conditions.

33. The control circuit of claim 32, wherein the one or more grounding conditions include one or more triggering events comprising:
a voltage at the transformer neutral above a predetermined threshold;
a time-overvoltage at the transformer neutral exceeding a second predetermined threshold;
actuation of an overvoltage protection device positioned in parallel with the direct current blocking component between the transformer neutral and the ground;
an alternating current between the transformer neutral and the ground above a predetermined AC threshold; or
an alternating current at the transformer neutral exceeding a second predetermined AC threshold over a predetermined amount of time.

34. The control circuit of claim 32, wherein the one or more blocking conditions include one or more triggering events comprising:
- a direct current or quasi-direct current between the transformer neutral and the ground;
- a direct current or quasi-direct current in at least one phase of the transformer;
- a direct current voltage at the transformer neutral;
- a harmonic signal in at least one phase of the transformer; or
- an electromagnetic event detected in a vicinity of the transformer.

* * * * *